US008279493B2

(12) United States Patent
Kimura et al.

(10) Patent No.: US 8,279,493 B2

(45) Date of Patent: Oct. 2, 2012

(54) IMAGE PROCESSING METHOD, PROGRAM THEREOF, IMAGE PROCESSING APPARATUS, AND INKJET RECORDING APPARATUS

(75) Inventors: Takashi Kimura, Kawasaki (JP); Masakazu Yoshida, Yokohama (JP); Toshihito Kamei, Machida (JP); Taku Satoh, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 1350 days.

(21) Appl. No.: 11/578,553

(22) PCT Filed: Mar. 14, 2006

(86) PCT No.: PCT/JP2006/005469

§ 371 (c)(1), (2), (4) Date: Oct. 16, 2006

(87) PCT Pub. No.: WO2006/098457

PCT Pub. Date: Sep. 21, 2006

(65) Prior Publication Data

US 2007/0206226 A1 Sep. 6, 2007

(30) Foreign Application Priority Data

Mar. 16, 2005 (JP) ................................ 2005-074318

(51) Int. Cl.

| | |
|---|---|
| ***H04N 1/40*** | (2006.01) |
| ***H04N 1/46*** | (2006.01) |
| ***H04N 1/21*** | (2006.01) |
| ***H04N 1/23*** | (2006.01) |
| ***H04N 1/00*** | (2006.01) |
| ***G06K 15/00*** | (2006.01) |
| ***G09C 5/00*** | (2006.01) |

(52) U.S. Cl. ....... 358/3.28; 358/1.9; 358/1.14; 358/501; 358/540; 358/401; 358/296; 380/55; 380/54

(58) Field of Classification Search .................. 358/1.8, 358/1.9, 1.14, 1.18, 3.01, 3.02, 3.28; 382/100; 283/902

See application file for complete search history.

(56) References Cited

U.S. PATENT DOCUMENTS 4,795,284 A 1/1989 Yumoto et al.

(Continued)

FOREIGN PATENT DOCUMENTS

JP 04 294682 10/1992

(Continued)

OTHER PUBLICATIONS

U.S. Appl. No. 07/557,565, filed Jul. 24, 1990.

U.S. Appl. No. 07/888,452, filed May 20, 1992.

(Continued)

*Primary Examiner* — King Poon

*Assistant Examiner* — Vincent Peren

(74) *Attorney, Agent, or Firm* — Oblon, Spivak, McClelland, Maier & Neustadt, L.L.P.

(57) ABSTRACT

An image processing method is disclosed. A printer driver is a program for performing the method. The printer driver forms print image data that are printed by an inkjet recording apparatus capable of forming multi-level dots by ejecting droplets of recording liquid. The printer driver transforms image data of a manuscript into manuscript image data corresponding to the multi-level dots capable of being output from the inkjet recording apparatus by applying an image process such as a CMM process, a BG/UCR/γ correction process, and a gradation process to the image data of the manuscript; further, forms the print image data corresponding to the multi-level dots capable of being output from the inkjet recording apparatus by combining the manuscript image data with data corresponding to the multi-level dots of an image pattern indicating that the manuscript is prohibited from being duplicated by a manuscript and tint block pattern combining section.

11 Claims, 14 Drawing Sheets

U.S. PATENT DOCUMENTS

| | | | | |
|---|---|---|---|---|
| 4,990,939 | A | 2/1991 | Sekiya et al. | |
| 5,172,139 | A | 12/1992 | Sekiya et al. | |
| 5,293,182 | A | 3/1994 | Sekiya et al. | |
| 5,389,962 | A | 2/1995 | Sekiya et al. | |
| 5,400,065 | A | 3/1995 | Tomono et al. | |
| 5,412,413 | A | 5/1995 | Sekiya et al. | |
| 5,508,520 | A | 4/1996 | Shoji et al. | |
| 5,600,356 | A | 2/1997 | Sekiya et al. | |
| 5,854,465 | A | 12/1998 | Kishi et al. | |
| 5,975,671 | A * | 11/1999 | Spaulding et al. | 347/15 |
| 6,923,520 | B2 | 8/2005 | Oikawa et al. | |
| 7,131,775 | B2 * | 11/2006 | Uchida et al. | 400/62 |
| 2001/0053299 | A1 * | 12/2001 | Matsunoshita et al. | 399/366 |
| 2002/0054317 | A1 * | 5/2002 | Matsunoshita et al. | 358/1.14 |
| 2003/0076540 | A1 * | 4/2003 | Hamashima et al. | 358/3.28 |
| 2003/0142331 | A1 * | 7/2003 | Tanaka | 358/1.9 |
| 2004/0051885 | A1 * | 3/2004 | Matsunoshita | 358/1.9 |
| 2004/0114190 | A1 * | 6/2004 | Man | 358/3.28 |
| 2004/0252347 | A1 * | 12/2004 | Hosoya et al. | 358/3.28 |
| 2004/0263911 | A1 * | 12/2004 | Rodriguez et al. | 358/3.28 |
| 2005/0041263 | A1 * | 2/2005 | Ishikawa et al. | 358/1.14 |
| 2005/0052682 | A1 * | 3/2005 | Ishikawa et al. | 358/1.14 |
| 2005/0078993 | A1 * | 4/2005 | Oomura et al. | 399/366 |
| 2005/0088701 | A1 * | 4/2005 | Uchida et al. | 358/3.28 |
| 2005/0174596 | A1 * | 8/2005 | Uchida et al. | 358/1.14 |
| 2005/0190411 | A1 * | 9/2005 | Ohno | 358/3.28 |
| 2005/0219634 | A1 * | 10/2005 | Murakami | 358/3.28 |

FOREIGN PATENT DOCUMENTS

| | | |
|---|---|---|
| JP | 09 191394 | 7/1997 |
| JP | 11 313206 | 11/1999 |
| JP | 2000 307847 | 11/2000 |
| JP | 2001 069340 | 3/2001 |
| JP | 2001-324898 | 11/2001 |
| JP | 2004 260341 | 9/2004 |

OTHER PUBLICATIONS

U.S. Appl. No. 08/182,374, filed Jan. 14, 1994.
U.S. Appl. No. 07/630,321, filed Dec. 19, 1990.
U.S. Appl. No. 07/880,163, filed May 5, 1992.
U.S. Appl. No. 08/174,425, filed Dec. 28, 1993.

* cited by examiner

IMAGE PROCESSING METHOD, PROGRAM THEREOF, IMAGE PROCESSING APPARATUS, AND INKJET RECORDING APPARATUS

TECHNICAL FIELD

The present invention generally relates to an image processing method, a program thereof, an image processing apparatus, and an inkjet recording apparatus, which outputs a printed document that can be determined to be a duplicated document when a document is duplicated.

BACKGROUND ART

In order to prevent illegal duplication of a document and to recognize that a document is a printed document whose duplication is prohibited, the following technologies are disclosed. As documents which are prohibited from being duplicated, there are certificates such as a resident card and a full copy of a family register, other important documents, a bank note, and securities such as a share, a bond.

For example, in Patent Document 1, an image processing apparatus is disclosed. The image processing apparatus includes a combining unit that combines an image of an object with an image pattern indicating that the image of the object is prohibited from being duplicated and an output unit which outputs data of the combined image to a predetermined output destination.

In addition, in Patent Document 2, another image processing apparatus is disclosed. The image processing apparatus includes an input unit for inputting color image data, a memorizing unit for storing identification information of an apparatus, and an output unit for outputting a color image shown by the color image data input by the input unit on a recording medium by using plural visible color materials. The output unit adds a specific pattern showing the identification information of the apparatus stored in the memorizing unit by using a color material which is difficult for human eyes to distinguish from of the plural visible color materials.

Further, in Patent Document 3, an electronic watermark inserting method, which inserts information into a digital image by using a frequency formation method (specifically, a Fourier transformation method), is disclosed. In Patent Document 4, a method is disclosed in which digital information readable by a machine is embedded in a half-tone image.

[Patent Document 1] Japanese Laid-Open Patent Application No. 2004-260341

[Patent Document 2] Japanese Patent No. 2614369

[Patent Document 3] Japanese Patent No. 3522056

[Patent Document 4] Japanese Laid-Open Patent Application No. 11-313206

As another technology, paper called counterfeit preventing paper, in which a special printing is performed on the paper beforehand, is used. On the paper, a mark which prohibits duplication is printed with a concentration reproducible by a duplicating apparatus. The mark is, for example, "duplication prohibited". In addition, the background is printed with a concentration by which the background is hardly reproduced. The concentration of the mark part and the background part is determined to be hardly distinguishable by human eyes. The mark part and the background part formed other than in the document region are called "tint blocks".

The tint block is embedded in the paper so that information of a document can be hardly damaged, and must be a pattern from which the document can be distinguished as a duplicated one when the document is duplicated. In an electro-photographic system using in a printer such as a laser printer, printing of a tint block pattern has been realized.

In the electronic watermark inserting method described in Patent Document 3, in the frequency transformation process, generally, a large amount of data must be processes and it is very difficult to realize the method. In addition, in the method in which information is embedded in a half-tone image described in Patent Document 4, information can be embedded in a print (half-tone) image. However, the method cannot be applied to a binary image such as a document image for forming a half-tone image. In order to solve these problems, as described in Patent Document 1, the image data are output by combining an image of an object with an image pattern indicating that it is prohibited to duplicate the image of the object. Or as described in Patent Document 2, a special pattern showing identification information of the apparatus is added.

However, as an image forming apparatus, recently, in addition to an apparatus using the electro-photographic system, an image forming apparatus of an inkjet recording system has been widely used in which inkjet recording system a liquid ejecting head for ejecting ink droplets (recording liquid) is used as a recording head. In the inkjet recording apparatus, a liquid ejecting head providing a pressure generating unit which applies pressure to ink in an ink chamber to which a nozzle for ejecting ink droplets is connected is used as a recording head, a force is given to ink in the liquid chamber by driving the pressure generating unit of the liquid ejecting head corresponding to image information, and the ink droplets are ejected from the nozzle. With this, an image is formed on a recording medium such as a paper and a film by attaching the ink droplets onto the recording medium.

There are differences in a dot position and a dot size which can be formed and an expansion of the dot on the recording medium between printing in the inkjet recording system and printing in the electro-photographic system. That is, in the electro-photographic system, a dot can be formed on an approximately arbitrary position; however, in the inkjet recording system, dot positions which can be formed are restricted by the nozzle pitch of the recording head and a driving frequency. In addition, in the electro-photographic system, the dot does not expand into the recording medium because there is no penetrating toner transferred to the recording medium. However, in the inkjet recording system, the recording liquid penetrates into the recording medium after being ejected; consequently, the dot is expanded.

In a case where printing is performed by using an inkjet recording apparatus which forms an image by ejecting ink droplets, in Patent Document 1, it is difficult to output a pattern indicating that the document is prohibited from being duplicated, and in Patent Document 2, it is difficult to output a special pattern showing identification information of the apparatus.

DISCLOSURE OF THE INVENTION

The present invention may solve one or more of the problems in the conventional technologies. According to embodiments of the present invention, there is provided an image processing method, a program thereof, an image processing apparatus, and an inkjet recording apparatus, which outputs a printed document that can be determined to be a duplicated document when the document is duplicated.

In order to achieve the above object, according one aspect of the present invention, there is provided an image processing method which forms print image data that are printed by an inkjet recording apparatus capable of forming multi-level dots by ejecting droplets of recording liquid. The image processing method includes the steps of transforming image data of a manuscript into manuscript image data corresponding to the multi-level dots capable of being output from the inkjet recording apparatus by applying an image process to the image data of the manuscript, and forming the print image data corresponding to the multi-level dots capable of being output from the inkjet recording apparatus by combining the manuscript image data with data corresponding to the multi-level dots of an image pattern indicating that the manuscript is prohibited from being duplicated.

According to another aspect of the present invention, there is provided an image processing method which forms print image data that are printed by an inkjet recording apparatus capable of forming multi-level dots by ejecting droplets of recording liquid. The image processing method includes the steps of combining image data of a manuscript with an image pattern indicating that the manuscript is prohibited from being duplicated, and forming the print image data corresponding to the multi-level dots capable of being output from the inkjet recording apparatus by applying an image process to combined image data.

In this case, it is preferable that the image pattern be formed on only a background part of the image data of the manuscript.

In the image processing method, it is preferable that the image pattern be a pattern in which a dot used in a print out has an image concentration or a dot size capable of being reproduced by a duplicating apparatus that duplicates the manuscript. Or it is preferable that the image pattern be a pattern which is formed by at least two dots whose sizes are different at the time of the print out. Or it is preferable that the image pattern be a pattern which is formed by at least two dots whose sizes are different and whose array density is different at the time of the print out. Or it is preferable that the image pattern be a pattern which is formed by at least two dots whose sizes are different of one color at the time of the print out.

According to another aspect of the present invention, there is provided a program which causes a computer to perform a forming process of print image data that are printed by an inkjet recording apparatus capable of forming multi-level dots by ejecting droplets of recording liquid. The program causes the computer to perform the steps of the image processing method.

According to another aspect of the present invention, there is provided an image processing apparatus which processes to form print image data that are printed by an inkjet recording apparatus capable of forming multi-level dots by ejecting droplets of recording liquid. The image processing apparatus includes a unit that performs the image processing method or a program for performing the image processing method.

According to another aspect of the present invention, there is provided an inkjet recording apparatus which can form print image data by ejecting droplets of recording liquid. The inkjet recording apparatus includes a combining unit that combines image data of a manuscript with an image pattern indicating that the manuscript is prohibited from being duplicated, and a forming unit that forms print image data corresponding to the multi-level dots by applying an image process to combined image data.

In this case, it is preferable that the image pattern be formed on only a background part of the image data of the manuscript.

In the inkjet recording apparatus, it is preferable that the image pattern be a pattern in which a dot used in a print out has an image concentration or a dot size capable of being reproduced by a duplicating apparatus that duplicates the manuscript, the image pattern is a pattern which is formed by at least two dots whose sizes are different at the time of the print out, the image pattern is a pattern which is formed by at least two dots whose sizes are different and whose array density is different at the time of the print out, or the image pattern is a pattern which is formed by at least two dots whose sizes are different of one color at the time of the print out.

According to the embodiments of the present invention, an image processing method forms print image data that are printed by an inkjet recording apparatus capable of forming multi-level dots by ejecting droplets of recording liquid. The image processing method includes the steps of transforming image data of a manuscript into manuscript image data corresponding to the multi-level dots capable of being output from the inkjet recording apparatus by applying an image process to the image data of the manuscript, and forming the print image data corresponding to the multi-level dots capable of being output from the inkjet recording apparatus by combining the manuscript image data with data corresponding to the multi-level dots of an image pattern indicating that the manuscript is prohibited from being duplicated. Or the image processing method includes the steps of combining image data of a manuscript with an image pattern indicating that the manuscript is prohibited from being duplicated, and forming the print image data corresponding to the multi-level dots capable of being output from the inkjet recording apparatus by applying an image process to combined image data. Therefore, when a formed document is duplicated by the inkjet recording apparatus, the document can be confirmed to be a document that is prohibited from being duplicated.

According to an image processing program in the embodiments of the present invention, the program causes a computer to perform the steps of the image processing method. Further, the image processing apparatus includes a unit that performs the image processing method or the program that performs the image processing method. Therefore, when a formed document is duplicated by the inkjet recording apparatus, the document can be confirmed to be a document that is prohibited from being duplicated.

According to an inkjet recording apparatus in the embodiment of the present invention, the inkjet recording apparatus includes a combining unit that combines image data of a manuscript with an image pattern indicating that the manuscript is prohibited from being duplicated, and a forming unit that forms print image data corresponding to the multi-level dots by applying an image process to combined image data. Therefore, when a formed document is duplicated by the inkjet recording apparatus, the document can be confirmed to be a document that is prohibited from being duplicated.

These and other objects, features, and advantages of the present invention will become more apparent from the following detailed description of preferred embodiments given with reference to the accompanying drawings.

BEST MODE FOR CARRYING OUT THE INVENTION

Figure 1:
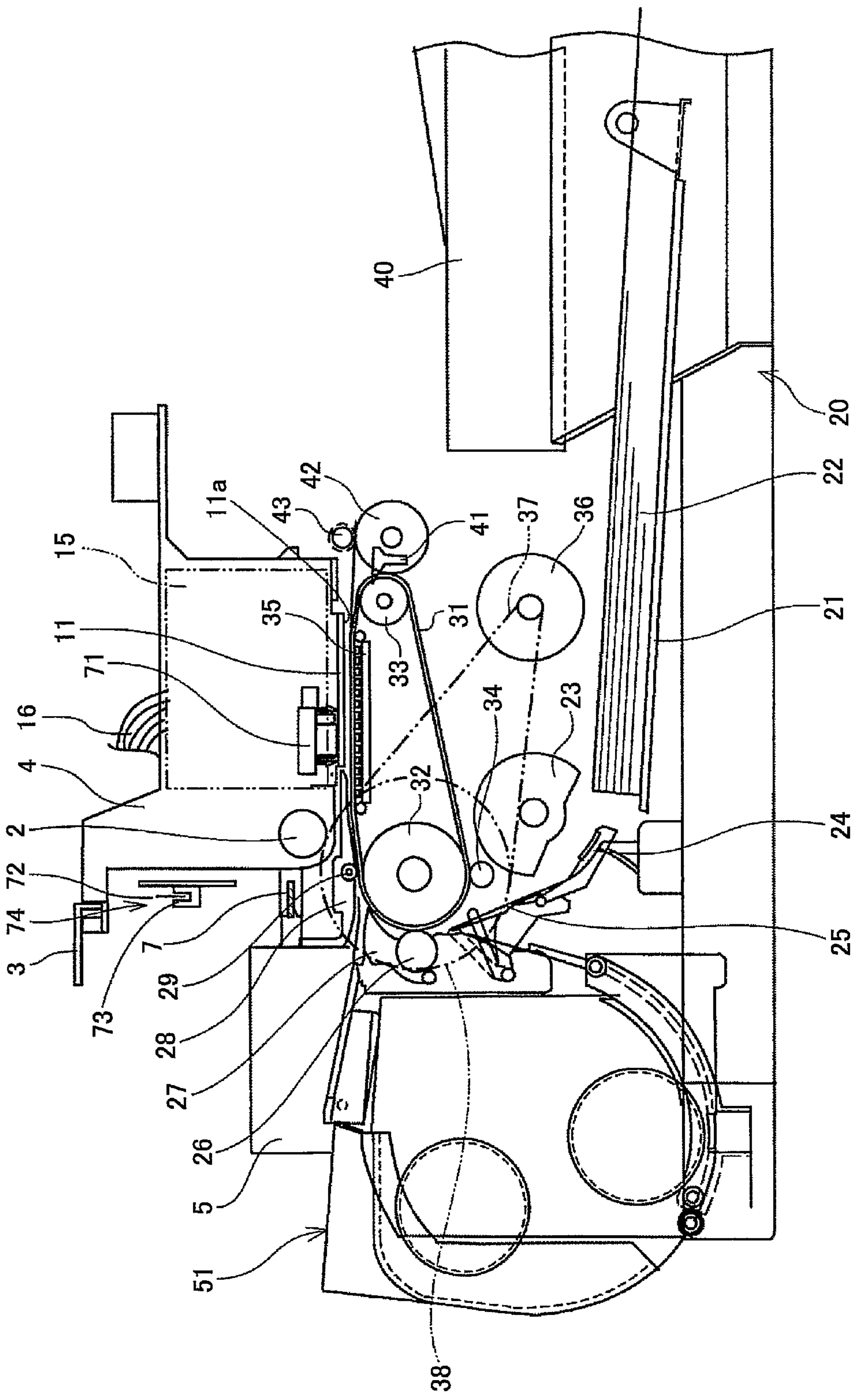
FIG. 1 is a schematic diagram of a part of an inkjet recording apparatus which can form multi-level dots according to an embodiment of the present invention.
Figure 2:
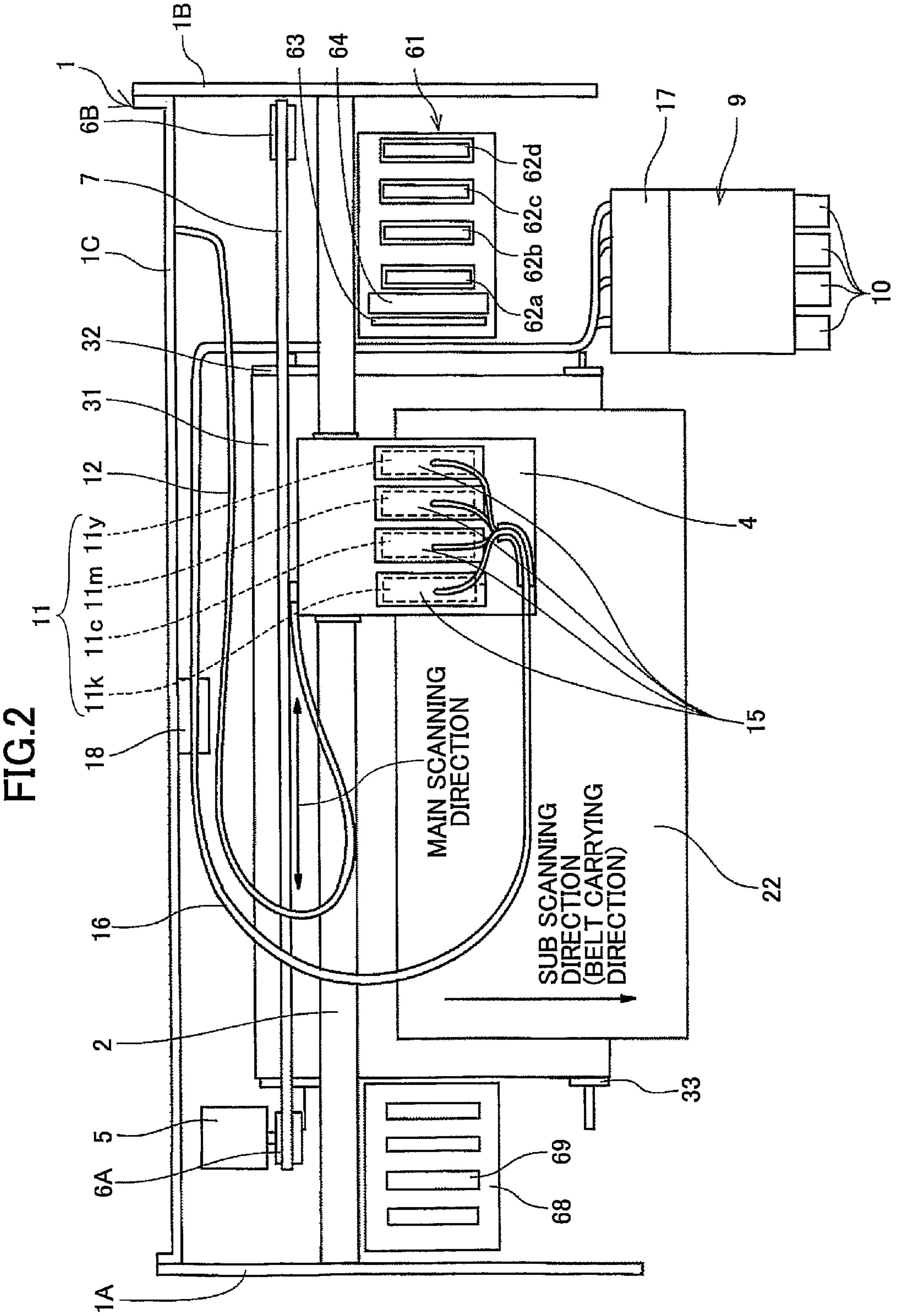
FIG. 2 is a plan view of a part of the inkjet recording apparatus shown in FIG. 1.

Next, referring to the drawings, embodiments of the present invention are explained in detail. FIG. 1 is a schematic diagram of a part of an inkjet recording apparatus which can form multi-level dots according to an embodiment of the present invention. FIG. 2 is a plan view of a part of the inkjet recording apparatus shown in FIG. 1. Referring to FIGS. 1 and 2, structural elements of the inkjet recording apparatus according to the embodiment of the present invention are explained.

In the inkjet recording apparatus, a carriage 4 is slidably held in the main scanning direction by a guide rod 2 which is hung between a left side plate 1A and a right side plate 1B of a frame 1 and a stay 3, and the carriage 4 is moved in the main scanning direction (the arrow directions in FIG. 2) by a main scanning direction motor 5 via a timing belt which is wound around a driving pulley 6A and a driven pulley 6B.

In the carriage 4, a recording head 11 composed of, for example, four ink droplet ejecting heads 11*k*, 11*c*, 11*m*, and 11*y* that eject ink droplets of black (Bk), cyan (C), magenta (M), and yellow (Y), respectively, is disposed in a manner so that the ink ejecting direction is downward. In this, a nozzle array of nozzle faces 11*a* in which plural ink ejecting nozzles of the recording head 11 are formed is disposed in the perpendicular direction (the sub scanning direction) of the main scanning direction. In the above, four independent recording heads for ejecting four corresponding colors are used; however, one recording head which can eject four-color ink by having plural nozzles, or plural heads can be used. In addition, the number of colors and the order of disposition of the heads are not limited to the above.

Figure 3:
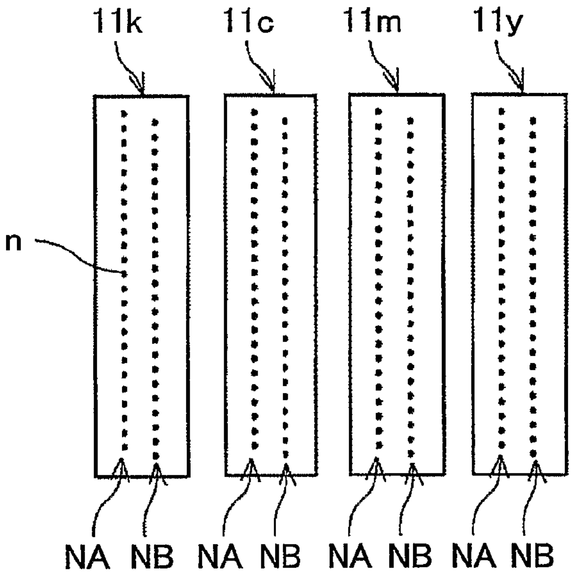
FIG. 3 is a diagram showing disposition of ink droplet ejecting heads shown in FIG. 2.
Figure 4:
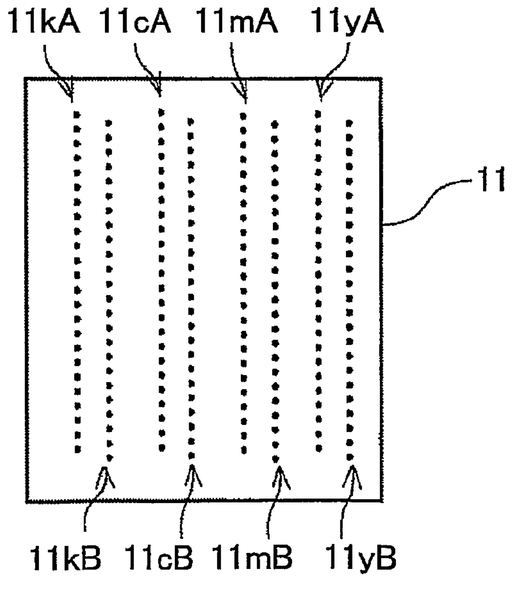
FIG. 4 is a diagram showing another disposition of the ink droplet ejecting heads shown in FIG. 2.

In the embodiment of the present invention, as the recording head 11, the four ink droplet ejecting heads 11*k*, 11*c*, 11*m*, and 11*y* that eject ink droplets of black (Bk), cyan (C), magenta (M), and yellow (Y), respectively, are used. FIG. 3 is a diagram showing disposition of the ink droplet ejecting heads shown in FIG. 2. As shown in FIG. 3, each of the four ink droplet ejecting heads 11*k*, 11*c*, 11*m*, and 11*y* has two nozzle rows (NA and NB) in which plural "n" nozzles for ejecting ink droplets are arrayed in one row. FIG. 4 is a diagram showing another disposition of the ink droplet ejecting heads shown in FIG. 2. As shown in FIG. 4, two nozzle rows 11*k*A and 11*k*B, two nozzle rows 11*c*A and 11*c*B, two nozzle rows 11*m*A and 11*m*B, and two nozzle rows 11*y*A and 11*y*B can be disposed in one recording head 11. Or, the recording head 11 can be composed of a black ink droplet ejecting head having one nozzle row or plural nozzle rows and color ink droplet ejecting heads having one nozzle row or plural nozzle rows for each color.

Each of the ink droplet ejecting heads (inkjet heads) of which the recording head 11 is composed provides a piezoelectric actuator formed by a piezoelectric element as a pressure generator that generates pressure for ejecting ink droplets. That is, as the pressure generator, when a thermal type pressure generator, which uses a heating resistor for generating bubbles, is used, it is difficult to accurately control the volume of the bubble, and the size of a dot which can be formed cannot be largely changed. Consequently, basically, the size is binary, and generally, the gradation is obliged to be expressed by the number of formed dots. On the other hand, when the piezoelectric actuator is used, the amount of displacement of the piezoelectric element can be accurately controlled, and the size of a dot which is formed can be largely changed. Consequently, multiple-gradation can be expressed. In this case, in order to change the diameter of the dot, that is, in order to form multi-level dots, for example, the voltage, the pulse width, and the number of pulses of the driving pulse are changed.

A driver IC is installed in the recording head 11 and is connected to a controller (not shown) via a harness {FPC (flexible print cable)}.

Sub tanks 15 for four colors for supplying ink to the recording head 11 are installed in the carriage 4. Ink of each color is supplied from the corresponding ink cartridges 10 installed in a cartridge storing section 9 to the corresponding sub tanks 15 via corresponding ink supplying tubes 16. An ink supplying pump 17 for supplying each ink to its ink supplying tube 16 is installed in the cartridge storing section 9. The ink supplying tubes 16 are held by a back plate 1C of the frame 1 on the middle of the connection.

In order to feed a paper 22 stored on a paper storing section 21 of a paper feeding tray 20, a half-moon-shaped roller (paper feeding roller) 23 which supplies each paper 22 from the paper storing section 21, and a paper separation pad 24, made of a material having a large friction factor, disposed facing the paper feeding roller 23 are installed. The paper separation pad 24 is pushed toward the paper feeding roller 23.

In order to supply the paper 22 to a position under the recording head 11, a guide member 25 for guiding the paper 22, a counter roller 26, a paper carrying guide member 27, a pushing member 28 including a pressure applying roller 29 are installed. Further, a carrying belt 31 which carries the paper 22 at a position facing the recording head 11 by adhering with an electrostatic force is installed.

The carrying belt 31 is an endless belt that is wound around a carrying roller 32 and a tension roller 33, and is rotated in the belt carrying direction (sub scanning direction), and is charged by a charging roller 34 while being rotated.

The carrying belt 31 can be a single-layered belt or a plural-layered belt (double-layered or more). When the carrying belt 31 is the single-layered belt, since the carrying belt 31 contacts the paper 22 and the charging roller 34, the entire layer is formed by an insulation material. When the carrying belt 31 is the plural-layered belt, it is preferable that a layer contacting the paper 22 and the charging roller 34 be formed by an insulation material and a layer not contacting the paper 22 and the charging roller 34 be formed by a conductive material.

As the insulation material for the single-layered carrying belt 31 and for the insulation layer of the plural-layered carrying belt 31, one of the following materials can be used. That is, resin such as PET, PEI, PVDF, PC, ETFE, and PTEF, or elastomer without containing a conductive material can be used, and the volume resistivity of the material is 1012 Ωcm or more; preferably, 1015 Ωcm. As the conductive material for the conductive layer of the plural-layered carrying belt 31, a material in which carbon is contained in the above resin or elastomer and the volume resistivity is 105 to 107 Ωcm is preferable.

The charging roller 34 contacts the insulation layer which is a front face of the carrying belt 31 (in the case of the plural-layered belt), is rotated by being moved by the rotation of the carrying belt 31, and pressure is applied to both ends of the axle. The charging roller 34 is made of a conductive material whose volume resistivity is 106 to 109 Ω/cm. An AC bias voltage of, for example, 2 kV (high voltage) is applied to the charging roller 34 from an AC bias voltage supplying section (high voltage power source) (described below). The AC bias voltage can be a sine wave or a chopping wave; however, a square wave is preferable.

A guide member 35 is disposed on the back face of the carrying belt 31 corresponding to an image forming region of the recording head 11. The upper face of the guide member 35 protrudes beyond a line tangent to the carrying roller 32 and the tension roller 33 supporting the carrying belt 31 to the side of the recording head 11. With this, the flatness of the carrying belt 31 in the image forming region can be accurately maintained.

The carrying roller 32 is rotated by a sub scanning direction motor 36 via a driving belt 37 and a timing roller 38, and the carrying belt 31 is rotated in the belt carrying direction (see FIG. 2) by the rotation of the carrying roller 32. An encoder wheel in which a slit is formed is attached to the axle of the carrying roller 32, and a transmission type photo-sensor for detecting the slit is disposed. With this, a wheel encoder is composed of the encoder wheel and the photo-sensor. These are not shown in FIG. 2.

In order to output the paper 22 on which an image is recorded by the recording head 11 to a paper outputting tray 40, a paper separation claw 41 for separating the paper 22 from the carrying belt 31, paper outputting rollers 42 and 43 are disposed.

A both sides printing unit 51 is removably attached to the back side of the inkjet recording apparatus. The both sides printing unit 51 takes the paper 22 returned by the inverted rotation of the carrying belt 31 and inverts the paper 22 and feeds the inverted paper 22 between the counter roller 26 and the carrying belt 31. A paper manually inserting tray (not shown) is disposed on the both sides printing unit 51.

A nozzle maintaining and recovering mechanism 61 that operates to maintain a normal state of the nozzles of the recording head 11 and to causes the nozzles to recover from an abnormal state is disposed in a non-printing region located at one side in the main scanning direction of the carriage 4. The nozzle maintaining and recovering mechanism 61 provides caps 62*a*, 62*b*, 62*c*, and 62*d* (when those are not individually described, they are referred to as a cap 62) for capping the nozzle faces 11*a* of the recording head 11, a wiper blade 63 for wiping the nozzle faces 11*a*, and a remaining ink droplet receiving member 64 for receiving ink droplets which do not contribute to forming an image due to an increase of viscosity. In this, the cap 62*a* is a suction and humidity maintaining cap and the other caps 62*b* to 62*d* are humidity maintaining caps.

In addition, in the non-printing region located at the other side in the main scanning direction of the carriage 4, a remaining ink droplet receiving member 68 for receiving ink droplets which do not contribute to forming an image due to the increase of viscosity is disposed, and openings 69 are provided along the nozzle rows of the recording head 11.

A concentration sensor 71 formed by an infrared ray sensor for detecting the presence of the paper 22 is disposed in the carriage 4. The sensor is not limited to the infrared ray sensor. When the carriage 4 is at the home position, the concentration sensor 71 is disposed at a position of the side of the carrying belt 31 and at a position upstream in the paper carrying direction.

As described above, at the front side of the carriage 4, an encoder wheel 72 in which a slit is formed is disposed along the main scanning direction, and an encoder sensor 73 formed by a transmission type photo-sensor for detecting the slit is disposed on the front face side of the carriage 4. With this, a linear encoder for detecting the position of the carriage 4 in the main scanning direction is composed of the encoder wheel 72 and the encoder sensor 73.

Figure 5:
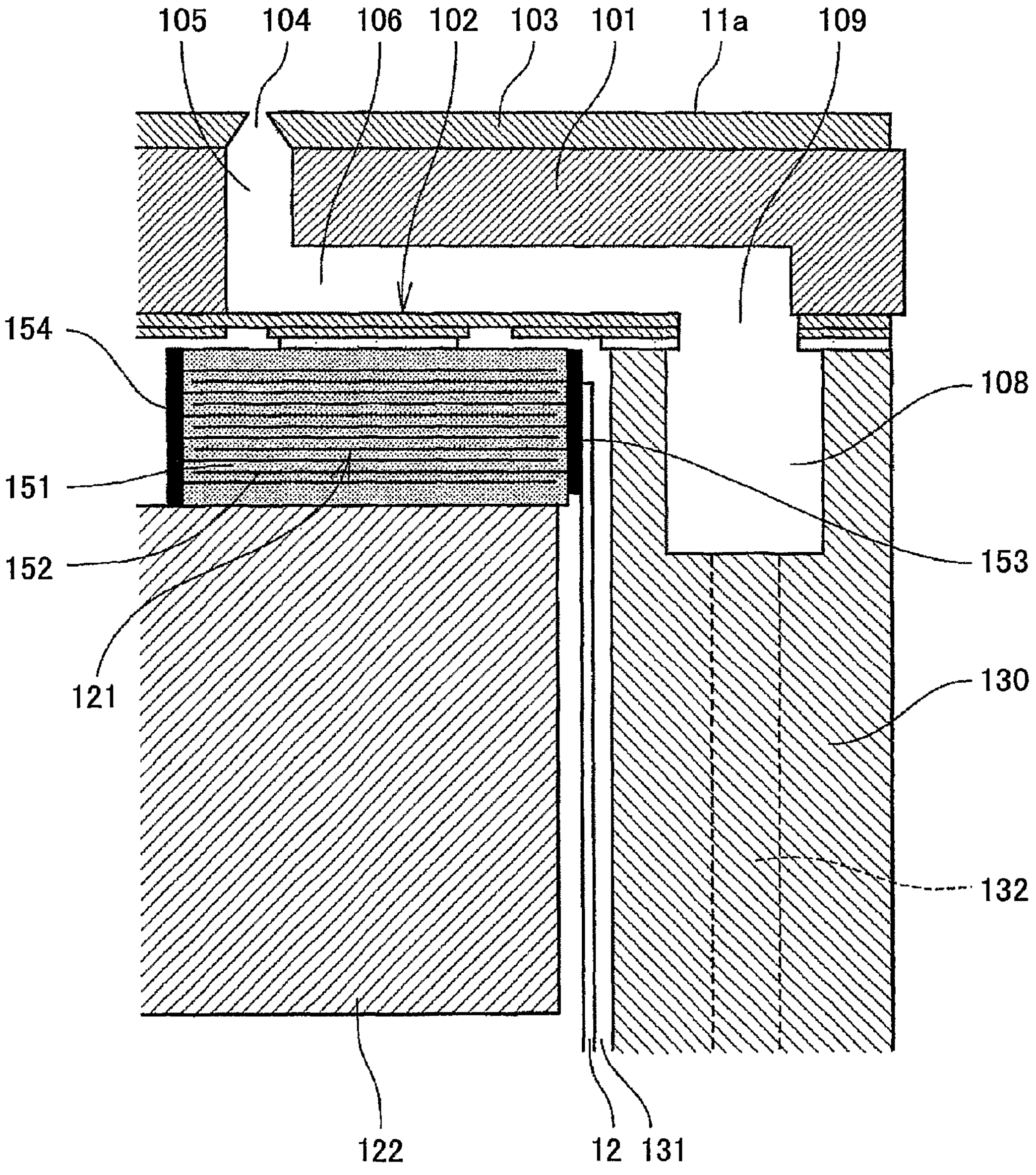
FIG. 5 is a cross-sectional view of the ink droplet ejecting head along the long length direction of a liquid chamber of the ink droplet ejecting head.
Figure 6:
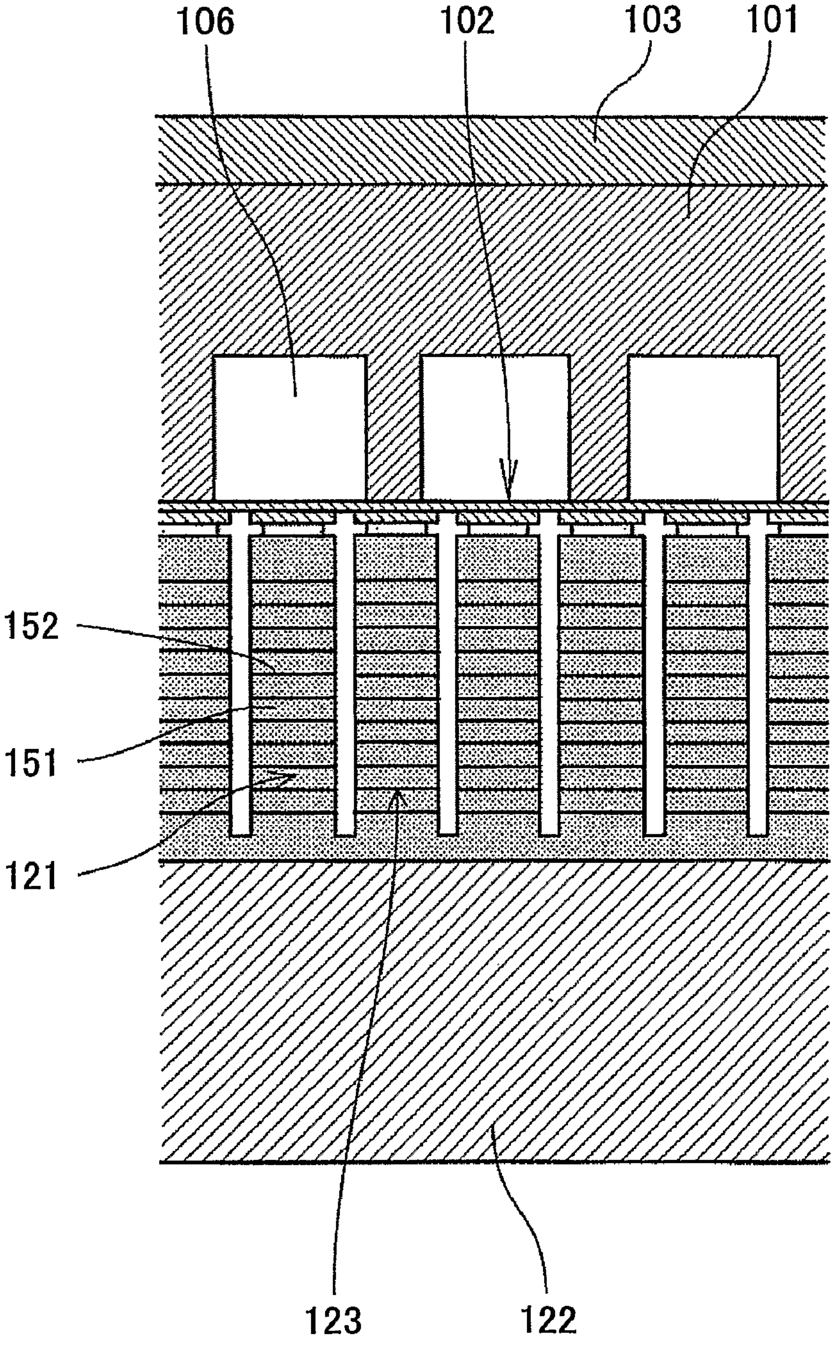
FIG. 6 is a cross-sectional view of the ink droplet ejecting head along the short length direction of the liquid chamber of the ink droplet ejecting head.

Next, in the inkjet recording apparatus, the ink droplet ejecting heads of which the recording head 11 is composed is explained. FIG. 5 is a cross-sectional view of the ink droplet ejecting head along the long length direction of a liquid chamber of the ink droplet ejecting head. FIG. 6 is a cross-sectional view of the ink droplet ejecting head along the short length direction of the liquid chamber of the ink droplet ejecting head.

In the ink droplet ejecting head, an ink flowing route plate 101 formed by applying anisotropic processing and so on to, for example, a single crystal silicon substrate; a vibration plate 102 formed by, for example, nickel electroforming, which plate 102 is bonded to the lower face of the ink flowing route plate 101; and a nozzle plate 103 bonded to the upper face of the ink flowing route plate 101 are stacked. With this, a nozzle connecting route 105 to which a nozzle 104 for ejecting ink droplets is connected, a liquid chamber 106, a common liquid chamber 108 for supplying ink to the liquid chamber 106, an ink supplying opening 109 connecting to the common liquid chamber 108, and so on are formed.

In addition, in the ink droplet ejecting head, a stacked type piezoelectric element 121 of two lines (one line in FIG. 6), which is a pressure generator (actuator) that applies pressure to ink in the liquid chamber 106 by deforming the vibration plate 102 as an electro-mechanical transducer, and a base substrate 122 to which the piezoelectric element 121 is secured are provided. A brace 123 (see FIG. 6) is formed between the piezoelectric elements 121. The brace 123 is formed at the same time as the piezoelectric elements 121 by separately forming piezoelectric members; however, since a driving voltage is not applied to the brace 123, the brace 123 is a simple brace.

A flexible print cable on which a driving circuit (driving IC) is installed is connected to the piezoelectric element 121.

The edge parts of the vibration plate 102 are bonded to a frame member 130. In the frame member 130, a space 131, to which an actuator unit composed of the piezoelectric element 121, the base substrate 122, and so on are attached, is formed. Further, in the frame member 130, a concave section that becomes the common liquid chamber 108 and an ink supplying hole 132 for supplying ink from the outside to the common liquid chamber 108 are formed. The frame member 130 is formed by injection molding of, for example, thermosetting resin such as epoxy resin or polyphenylene sulfite.

The ink flowing route plate 101 is formed by applying anisotropic processing and so on to, for example, a single crystal silicon substrate of a crystal face (110) by using alkaline liquid such as potassium hydroxide water-soluble solution (KOH). With this, the nozzle connecting route 105 and the liquid chamber 106 are formed. However, the material is not limited to single crystal silicon; stainless steel or photosensitive resin can be used for the ink flowing route plate 101.

The vibration plate 102 is made of a nickel plate by, for example, electroforming. However, the vibration plate 102 can be made of a metal plate other than nickel plate or a material in which a metal and resin are bonded. The piezoelectric element 121 and the brace 123 are bonded to the vibration plate 102 by adhesive, and further, the frame member 130 is bonded.

In the nozzle plate 103, the nozzle 104 of 10 to 30 μm diameter is formed corresponding to each liquid chamber 106, and the nozzle plate 103 is bonded to the ink flowing route plate 101 by adhesive. A water repellent layer is formed on the uppermost face of the nozzle plate 103 made of a metal member via a predetermined layer. The face of the nozzle plate 103 is the nozzle face 11*a* described above.

The piezoelectric element 121 is a stacked type piezoelectric element (PZT) in which a piezoelectric material 151 and an internal electrode 152 are alternately stacked. An individual electrode 153 is connected to the internal electrode 152 drawn out to one side, and a common electrode 154 is connected to the internal electrodes 152 drawn out to the other side. In the embodiment of the present invention, as the piezoelectric direction of the piezoelectric element 121 changes, pressure is applied to ink in the liquid chamber 106 by using displacement in the d33 direction. However, pressure can be applied to ink in the liquid chamber 106 by using displacement in the d31 direction. In addition, one line of the piezoelectric element 121 can be disposed on one base substrate 122.

In the ink droplet ejecting head with the above structure, when a voltage applied to the piezoelectric element 121 is lowered from the reference voltage, the piezoelectric element 121 contracts, and the vibration plate 102 is moved downward so that the volume of the liquid chamber 106 is expanded, and ink flows into the liquid chamber 106. After this, when the piezoelectric element 121 is expanded in the stacked direction by raising the voltage applied to the piezoelectric element 121, the vibration plate 102 is displaced in the nozzle direction and the volume of the liquid chamber 106 is reduced. With this, pressure is applied to ink in the liquid chamber 106 and ink droplets are ejected from the nozzle 104.

When the voltage applied to the piezoelectric element 121 is returned to the reference voltage, the vibration plate 102 is returned to the initial position, the volume of the liquid chamber 106 is expanded so that negative pressure is generated, and ink flows into the liquid chamber 106 from the common liquid chamber 108. With this, the vibration of the meniscus face of the nozzle 104 is attenuated and stabilized. Then, an operation for subsequent ink droplet ejecting is performed.

In the driving method of the ink droplet ejecting head, ink droplets are ejected by the expansion of the piezoelectric element 121. However, depending on the structure, ink droplets can be ejected by the contraction of the piezoelectric element 121.

In the inkjet recording apparatus, each paper 22 is fed from the paper storing section 21 in the approximate upward direction by guided by the guide member 25. The paper 22 is carried between the carrying belt 31 and the counter roller 26, the tip of the paper 22 is guided by the paper carrying guide member 27, and the paper 22 is pushed to the carrying belt 31 by the pressure applying roller 29. With this, the carrying direction of the paper 22 is changed approximately 90 degrees.

At this time, an AC voltage is applied to the charging roller 34 from the AC bias supplying section (described below in detail) so that the carrying belt 31 is charged in the sub scanning direction with a charge voltage pattern in which a plus voltage and a minus voltage are alternately applied with a predetermined width. When the paper 22 is supplied on the carrying belt 31 on which the plus voltage and the minus voltage are alternately charged, the paper 22 is adhered to the carrying belt 31 with the electrostatic force, and the paper 22 is carried in the sub scanning direction by the rotation of the carrying belt 31.

When the recording head 11 is driven corresponding to an image signal while the carriage 4 is being moved, the recording head 11 records one line of an image on the stopped paper 22 by ejecting ink droplets. After carrying the paper 22 by a predetermined amount, the next line of the image is recorded on the paper 22. When a recording completion signal or a signal that the end of the paper 22 reaches the end of the recording region is received, the recording operation is finished, and the paper 22 is output to the paper outputting tray 40.

In case of the both sides printing, when an image is printed on one side of the paper 22, the paper 22 is supplied to the both sides printing unit 51 by inversely rotating the carrying belt 31, and the paper 22 is inverted. The inverted paper 22 is supplied again between the counter roller 26 and the carrying belt 31 and an image is printed on the other side of the paper 22 carried by the carrying belt 31 with timing control. After printing, the paper 22 on whose both sides images are printed is output to the paper outputting tray 40.

Next, ink (recording liquid) using in the inkjet recording apparatus is explained. When a document for which duplication is prohibited is printed by the inkjet recording apparatus, it is proper that dots applied to a paper expand by penetrating along the fiber of the paper. Therefore, when tint block printing is attempted, it is preferable to use ink in which expansion of dots and feathering of the dots are as small as possible. Therefore, the following ink is recommendable. However, the ink is not limited to that.

Ink for the inkjet recording apparatus contains the following components (1) through (10):

(1) 6 wt % or more of pigment (a self-dispersing pigment);

(2) Wetting agent 1;

(3) Wetting agent 2;

(4) Water-soluble organic solvent;

(5) Anionic or nonionic surfactant;

(6) Polyol or glycol ether that contains 8 or more carbon atoms;

(7) Emulsion;

(8) Preservative;

(9) PH adjustor; and

(10) Deionized water.

In this, pigment as a colorant for printing and a solvent for dissolving or dispersing the pigment are used as essential components and a wetting agent, a surfactant, an emulsion, a preservative, and a pH adjustor are further used as additives. A wetting agent 1 and a wetting agent 2 are mixed so as to exploit the characteristics of the respective wetting agents and to easily adjust the viscosity of the ink.

The kind of (1) pigment is not particularly limited and both an inorganic pigment and an organic pigment can be used. As an inorganic pigment, there can be used any of carbon blacks produced by well-known methods such as a contact method, a furnace method and a thermal method as well as titanium oxide and iron oxide. In addition, there can be used as an organic pigment, azo pigments (including azo lakes, insoluble azo pigments, condensed azo pigments, chelate-type azo pigments, and so on), polycyclic pigments (for example, phthalocyanine pigments, perylene pigments, perynone pigments, anthraquinone pigments, quinacridone pigments, dioxazine pigments, thioindigo pigments, isoindolinone pigments, quinophthalone pigments, and so on), chelate-type dyes (for example, chelate-type basic dyes, chelate-type acidic dyes, and so on), nitro pigments, nitroso pigments, and aniline black, and so on.

Among these, a pigment having good affinity with water is preferably used. The particle diameter of a pigment is preferably 0.05 μm to 10 μm, more preferably, 1 μm or less, most preferably 0.16 μm or less.

The content of a pigment as a colorant in ink is preferably about 6% by weight to about 20% by weight, more preferably about 8 by weight to about 12% by weight.

As specific examples of pigments that are preferably used, the following pigments are provided.

For black ink, there can be provided carbon blacks (C.I. pigment black 7) such as furnace black, lamp black, acetylene black and channel black, metals such as copper and iron (C.I. pigment black 11), titanium oxide, and organic pigments such as aniline black (C.I. pigment black 1).

In addition, for color ink, there can be provided C.I. pigment yellows 1 (fast yellow G), 3, 12 (disazo yellow AAA), 13, 14, 17, 24, 34, 35, 37, 42 (yellow iron oxide), 53, 55, 81, 83 (disazo yellow HR), 95, 97, 98, 100, 101, 104, 108, 109, 110, 117, 120, 138 and 153, C.I. pigment oranges 5, 13, 16, 17, 36, 43 and 51, C.I. pigment reds 1, 2, 3, 5, 17, 22 (brilliant fast scarlet), 23, 31, 38, 48:2 (permanent red 2B (Ba)), 48:2 (permanent red 2B (Ca)), 48:3 (permanent red 2B (Sr)), 48:4 (permanent red 2B (Mn)), 49:1, 52:2, 53:1, 57:1 (brilliant carmine 6B), 60:1, 63:1, 63:2, 64:1, 81 (rhodamine 6G lake), 83, 88, 101 (red iron oxide), 104, 105, 106, 108 (cadmium red), 112, 114, 122 (quinacridone magenta), 123, 146, 149, 166, 168, 170, 172, 177, 178, 179, 185, 190, 193, 209 and 219, C.I. pigment violets 1 (rhodamine lake), 3, 5:1, 16, 19, 23 and 38, C.I. pigment blues 1, 2, 15 (phthalocyanine blue R), 15:1, 15:2, 15:3 (phthalocyanine blue E), 16, 17:1, 56. 60 and 63, and C.I. pigment greens 1, 4, 7, 8, 10, 17, 18 and 36.

In addition, there can be also used graft pigments obtained by treating the surface of a pigment (for example, carbon) with a resin which is allowed to disperse in water and processed pigments obtained by providing the surface of a pigment (for example, carbon) with a functional group such as a sulfone group or a carboxyl group which is allowed to disperse in water.

Further, a pigment contained in a microcapsule and allowed to disperse in water may be used.

In this, according to the embodiment, it is preferable that a pigment for black ink be added into ink as pigment dispersion liquid obtained by dispersing a pigment with a dispersant in a water-soluble medium. As a preferable dispersant, well-known dispersing liquid used for preparing conventionally publicly-known pigment dispersion liquid can be used.

As a material for the dispersing liquid, for example, the following materials can be provided. That is, there can be provided poly(acrylic acid), poly(methacrylic acid), acrylic acid-acrylonitrile copolymer, vinyl acetate-acrylic acid ester copolymers, acrylic acid-alkyl acrylate copolymers, styrene-acrylic acid copolymer, styrene-methacrylic acid copolymer, styrene-acrylic acid-alkyl acrylate copolymers, styrene-methacrylic acid-alkyl acrylate copolymers, styrene-α-methylstyrene-acrylic acid copolymer, styrene-α-methylstyrene-acrylic acid-alkyl acrylate copolymers, styrene-maleic acid copolymer, vinylnaphthalene-maleic acid copolymer, vinyl acetate-ethylene copolymer, vinyl acetate-fatty acid vinyl ester-ethylene copolymers, vinyl acetate-maleic acid ester copolymer, vinyl acetate-crotonic acid copolymer and vinyl acetate-acrylic acid copolymer.

In addition, according to the embodiment of the present invention, the weight-average molecular weights of these copolymers are preferably 3,000 to 50,000, more preferably 5,000 to 30,000, most preferably 7,000 to 15,000. The content of a dispersant is appropriately determined so that a pigment can be stably dispersed and other effects are not lost. The content ratio of a pigment to a dispersant is preferably 1:0.06 to 1:3, more preferably 1:0.125 to 1:3.

The content of a pigment used as a colorant is 6% by weight to 20% by weight per the total weight of recording ink and the pigment is in the form of particles with a particle diameter of 0.05 μm to 0.16 μm. The particles are dispersed in water with a dispersant and the dispersant is a polymeric dispersant with a molecular weight of 5,000 to 100,000. Image quality can be improved when at least one pyrrole derivative, particularly 2-pyrrolidone, is used as a water-soluble organic solvent.

In regard to (2) through (4) wetting agents 1 and 2 and a water-soluble organic solvent, water is frequently used as a liquid medium in ink but, for example, the following water-soluble organic solvents may be used in order to make ink have a desired physical property, to prevent ink from drying, and to improve the dissolution stability of ink components. Plural of these water-soluble organic solvents may be used. For example, the following specific examples of the wetting agents and the water-soluble organic solvent are provided.

That is, there can be provided multi-valent alcohols such as such as ethylene glycol, diethylene glycol, triethylene glycol, propylene glycol, dipropylene glycol, tripropylene glycol, tetraethylene glycol, hexylene glycol, polyethylene glycol, polypropylene glycol, 1,5-pentanediol, 1,6-hexanediol, glycerol, 1,2,6-hexanetriol, 1,2,4-butanetriol, 1,2,3-butanetriol and pentanetriol; multi-valent alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether and propylene glycol monoethyl ether; multi-valent alcohol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethylimidazolidinone, ε-caprolactam and γ-butyrolactone; amides such as formamide, N-methylformamide and N,N-dimethylformamide; amines such as monoethanolmine, diethanolamine, triethanolamine, monoethylamine, diethylamine and triethylamine; sulfur-containing compounds such as dimethylsulfoxide, sulfolane and thiodiethanol; and propylene carbonate and ethylene carbonate.

Among these organic solvents, particularly, diethylene glycol, thiodiethanol, polyethylene glycol 200-600, triethylene glycol, glycerol, 1,2,6-hexanetriol, 1,2,4-butanetriol, pentanetriol, 1,5-pentanediol, 2-pyrrolidone and N-methyl-2-pyrrolidone are preferable. These solvents have excellent properties in the solubility of ink components and the prevention of ink jet failure caused by vaporization of water.

As other wetting agents, wetting agents containing a saccharide are preferable. As specific examples of saccharides, onosaccharides, disaccharides, oligosaccharides (including trisaccharides and tetrasaccharides) and polysaccharides can be provided. Preferably, there are provided glucose, mannose, fructose, ribose, xylose, arabinose, galactose, maltose, cellobiose, lactose, sucrose, trehalose and maltotriose. Herein, polysaccharides are saccharides in a broader sense, including substances that are widely existing in nature such as α-cyclodextrine and cellulose.

In addition, as derivatives from these saccharides, there can be provided reduced saccharides from the aforementioned succharides (for example, represented by sugar alcohols (general formular $HOCH_2(CHOH)_nCH_2OH$, wherein n represents an integer of 2 to 5)), oxidized saccharides from the aforementioned succharides (for example, aldonic acid, uronic acid, and so on), amino acids and thio acids. Particularly, sugar alcohols are preferable and, as specific examples thereof, maltitol and sorbitol are provided.

The content of the saccharide is appropriately in the range of 0.1% by weight to 40% by weight, preferably 0.5% by weight to 30% by weight per an ink composition.

In addition, (5) surfactant is not particularly limited and, as an anionic surfactant, for example, there can be provided polyoxyethylene alkyl ether acetate salts, dodecylbenzenesulfonate salts, laurate salts and polyoxyethylene alkyl ether sulfate salts.

As a nonionic surfactant, for example, there can be provided polyoxyethylene alkyl ethers, polyoxyethylene alkyl esters, polyoxyethylenesorbitan fatty acid esters, polyoxyethylene alkylphenyl ethers, polyoxyethylene alkyl amines and polyoxyethylene alkyl amides. The nonionic surfactants can be used separately or in combination.

In the embodiment of the present invention, the surface tension of ink is an index of the permeability of ink into a paper, particularly, the dynamic surface tension of ink within a short time period equal to or less than 1 second after the formation of the ink surface, and is different from the static surface tension of ink which is measured at or after saturation time. As a measurement method of the surface tension, any of methods capable of measuring the dynamic surface tension of ink within 1 second or less such as a conventional publicly-known method disclosed in JP-A-63-031237, and a Wilhelmy suspended plate-type surface tension measuring apparatus can be used for the measurement in the present invention. The surface tension is preferably 40 $mJ/cm^2$ or less, more preferably 35 $mJ/cm^2$ or less for obtaining excellent fixation and drying properties of ink.

In regard to (6) polyol or glycol ether that contains 8 or more carbon atoms, it has been found that when 0.1% by weight to 10.0% by weight of partially water-soluble polyol and/or glycol ether having a solubility of 0.1% by weigh or greater and less than 4.5% by weight in water at 25° C., such as (a) 2-ethyl-1,3-hexanediol (solubility: 4.2% (20° C.)) and (b) 2,2,4-trimethyl-1,3-pentanediol (solubility: 2.0% (25° C.)) is added per the total weight of recording ink, the wettability of the ink to a thermal element can be improved and the ejection stability and frequency stability of ink can be obtained even if only a small amount of the polyol or glycol ether is added.

The penetrant having a solubility of 0.1% by weigh or greater and less than 4.5% by weight in water at 25° C. has low solubility but has an advantage of very high permeability. Therefore, the combination of the penetrant with solubility 0.1% by weigh or greater and less than 4.5% by weight in water at 25° C. and another solvent or another surfactant allows producing ink with very high permeability.

It is preferable that ink according to the embodiment of the present invention contain a resin emulsion.

The resin emulsion has a continuous phase of water and a dispersion phase of resin component(s) as follows. As a resin component for the dispersion phase, there can be provided acrylic resins, vinyl acetate-based resins, styrene-butadiene-based resins, vinyl chloride-based resins, acryl-styrene-based resins, butadiene-based resins and styrene-based resins.

According to the embodiment of the present invention, it is preferable that the resin be a polymer having both a hydrophilic moiety and a hydrophobic moiety. In addition, the particle diameter of the resin component is not particularly limited if emulsion can be obtained. However, the particle diameter is preferably about 150 nm or less, more preferably about 5 nm to about 100 nm.

These resin emulsions can be obtained by mixing resin particles in water, with a surfactant if necessary.

For example, emulsion of acrylic resin or styrene-acryl-based resin can be obtained by mixing a(n) (meth)acrylate ester or both a(n) (meth)acrylate ester and styrene, with a surfactant if necessary, in water. Normally, the mixing rate of the resin component(s) to the surfactant is preferably about 10:1 to about 5:1. If the content of the surfactant is less than the aforementioned quantity range, it may be difficult to obtain emulsion. On the other hand, if the content is over the aforementioned range, the water resisting property of ink may be degraded and the permeability of ink tends to degrade, which are not preferable.

The proportion of a resin as a component of the emulsion and water is 60 parts by weight to 400 parts by weight per 100 parts by weight of the resin, preferably in the range of 100 parts by weight to 200 parts by weight.

As commercially available resin emulsions, there are listed Microgel E-1002 and Microgel E-5002 (styrene-acrylic resin emulsions, produced by Nippon Paint Co., Ltd.), Boncoat 4001 (acrylic resin emulsion, produced by Dainippon Ink And Chemicals, Inc.), Boncoat 5454 (styrene-acrylic resin emulsion, produced by Dainippon Ink And Chemicals, Inc.), SAE-1014 (styrene-acrylic resin emulsion, produced by Nippon Zeon Co., Ltd.) and Saibinol SK-200 (acrylic resin emulsion, produced by Saiden Chemical Industry Co., Ltd.).

In addition, the resin emulsion is contained such that the content of a resin component is preferably 0.1% by weight to 40% by weight, more preferably 1% by weight to 25% by weight, of ink.

Resin emulsion has thickening and agglomerating properties so as to suppress the penetration of a coloring component and to accelerate the fixation of ink on a recording medium. Also, a certain kind of resin emulsion forms a coating on a recording medium and improves the rub resistance of printing.

Further, a conventionally-known additive can be added in addition to the aforementioned pigment, solvent and surfactant.

For example, as a preservative and fungi-proofing agent, sodium dehydroactate, sodium sorbate, sodium 2-pyridinethiol-1-oxide, sodium benzoate, sodium pentachlorophenolate, and so on can be used in the present invention.

As a pH adjustor, any kind of substance can be used if the pH of ink can be adjusted to 7 or greater without adversely affecting prepared ink.

As examples of the pH adjustor, there are provided amines such as diethanolamine and triethanolamine, alkali metal hydroxides such as lithium hydroxide, sodium hydroxide and potassium hydroxide, ammonium hydroxide, quaternary ammonium hydroxide, quaternary phosphonium hydroxide, and alkali metal carbonates such as lithium carbonate, sodium carbonate and potassium carbonate.

As chelating agents, for example, there are provided sodium ethylenediaminetetraacetate, sodium nitrilotriacetate, sodium hydroxyethylethylenediaminetriacetate, sodium diethylenetriaminepentaacetate and sodium uramildiacetate.

As anti-corrosive agents, for example, there are provided acidic sulfites, sodium thiosulfate, antimony thioglycollate, diisopropylammonium nitrite, pentaerythritol tetranitrate and dicyclohexylammonium nitrite.

When such prepared ink that contains, at least, a pigment, wetting agents, a polyol or glycol ether having 8 or more carbon atoms, an anionic or nonionic surfactant, a water-soluble organic solvent and water in which the concentration of the pigment is 6% by weight or greater and the ink viscosity is 8 cp or greater (25° C.) is used, a good color tone (with a sufficient color development property and sufficient color reproducibility), high image concentration and clear image quality with no feathering on characters or images can be obtained at the time of printing on a normal paper. Then, as described below, when a paper with an image indicating that duplicating of the paper is prohibited is output, dots of a tint block pattern (including a mark part for indicating duplication and a background part) can be reproduced clearly without blurring of the mark part or generation of background contamination which are caused by the difference of duplicating reproducibility in a duplicating apparatus among dot sizes.

Figure 7:
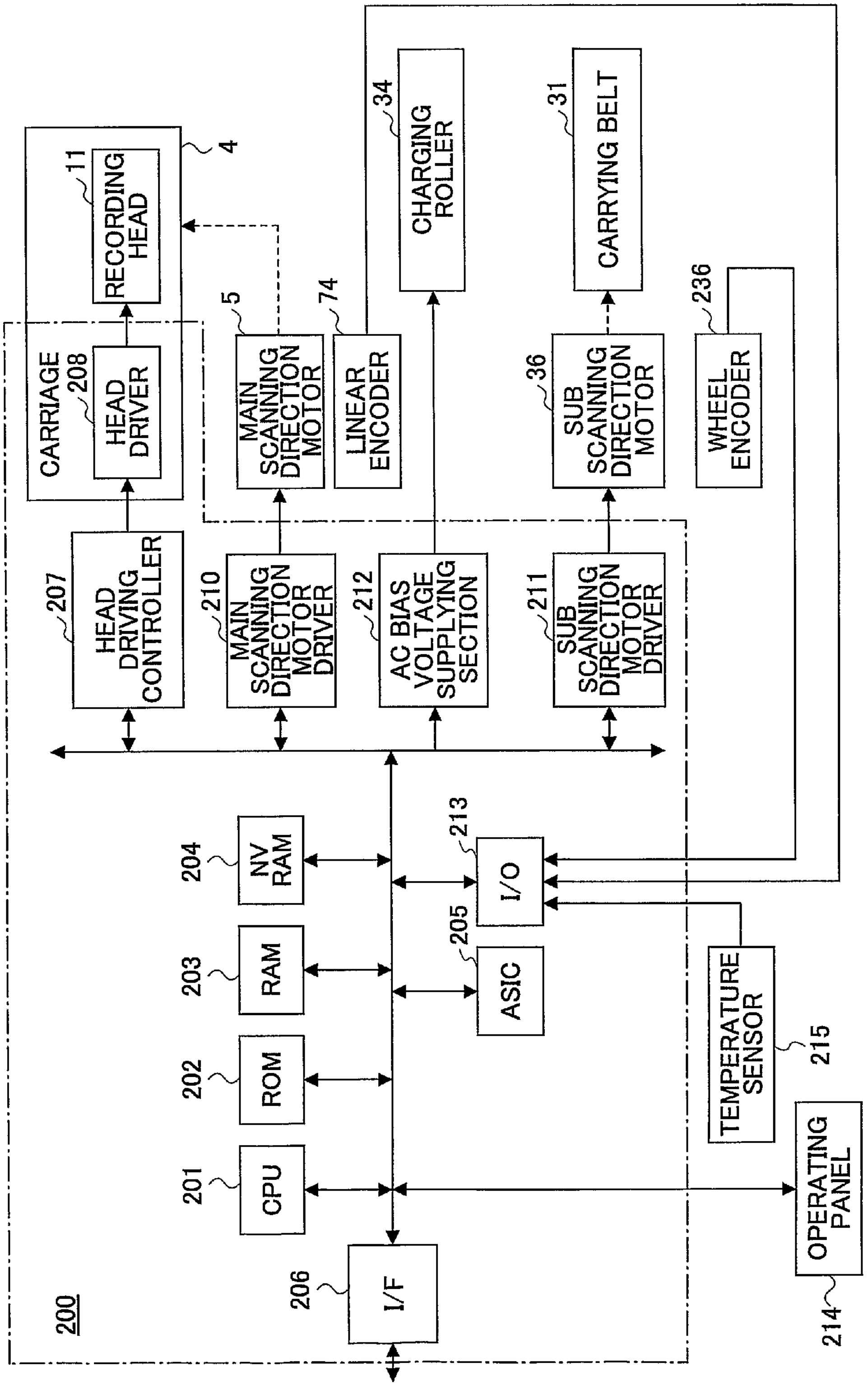
FIG. 7 is a block diagram showing a controlling section of the inkjet recording apparatus according to the embodiment of the present invention.

Next, a controlling section of the inkjet recording apparatus according to the embodiment of the present invention is explained. FIG. 7 is a block diagram showing a controlling section of the inkjet recording apparatus according to the embodiment of the present invention.

As shown in FIG. 7, a controlling section 200 of the inkjet recording apparatus includes a CPU 201 which controls all the elements in the inkjet recording apparatus, a ROM 202 in which a program executed by the CPU 201 and other fixed data are stored, a RAM 203 in which image data and other data are temporarily stored, a non-volatile memory (NVRAM) 204 which is a rewritable memory for storing data even when power to the apparatus is off, and an ASIC 205, which performs signal processing for image data, image processing such as order changing of data, and input and output signal processing for controlling the entire apparatus.

Further, the controlling section 200 includes an I/F 206, a head driving controller 207, a head driver 208, a main scanning direction motor driver 210, a sub scanning direction motor driver 211, an AC bias voltage supplying section 212, and an I/O 213. The I/F 206 receives/transmits data and signals from/to a host computer. The head driving controller 207 controls the driving of the recording head 11 by including a data transferring unit to the recording head 11. The head driver 208 (driver IC) drives the recording head 11 in the carriage 4. The main scanning direction motor driver 210 drives the main scanning direction motor 5. The sub scanning direction motor driver 211 drives the sub scanning direction motor 36. The AC bias voltage supplying section 212 supplies an AC bias voltage to the charging roller 34. To the I/O 213, pulses detected by a linear encoder 74 and a wheel encoder 236, a signal detected by a temperature sensor 215 which detects an ambient temperature, and signals detected by other sensors are input. An operating panel 214 which necessary information is input to and is displayed on is connected to the controlling section 200.

The controlling section 200 receives print data and so on from the host computer such as an information processing apparatus like a personal computer, an image reading apparatus like an image scanner, and an image taking apparatus like a digital camera at the I/F 206 via a cable or a network.

The CPU 201 in the controlling section 200 analyzes image data by reading the data from a receiving buffer in the I/F 206, causes the ASIC 205 to perform necessary image processing and change the order of data, and transfers the processed image data to the head driver 208 via the head driving controller 207. Generation of dot pattern data for outputting an image can be performed by storing font data in the ROM 202 or can be obtained from a printer driver in the host computer.

The head driving controller 207 transfers the image data as serial data to the head driver 208 and also outputs a transferring clock, a latch signal, a control signal, and so on which are necessary for transferring the image data and confirming the transfer to the head driver 208. In addition, the head driving controller 207 includes a D/A converter which converts digital pattern data of driving pulses read out from the ROM 202 by the CPU 201 into analog data and a driving waveform generator composed of an amplifier and so on, and outputs a driving waveform composed of one driving pulse (driving signal) or plural driving pulses to the head driver 208.

The head driver 208 drives the recording head 11 by selectively applying driving pulses of which a driving waveform is composed given from the head driving controller 207 based on serially input image data corresponding to one line of the recording head 11 to the piezoelectric element 121 (actuator) of the recording head 11.

The main scanning direction motor driver 210 drives the main scanning direction motor 5 via an internal motor driver by calculating a control value based on a target value given from the CPU 201 and a speed detecting value obtained by sampling detection pulses from the linear encoder 74.

Similarly, the sub scanning direction motor driver 211 drives the sub scanning direction motor 36 via an internal motor driver by calculating a control value based on a target value given from the CPU 201 and a speed detecting value obtained by sampling detection pulses from the wheel encoder 236.

Figure 8:
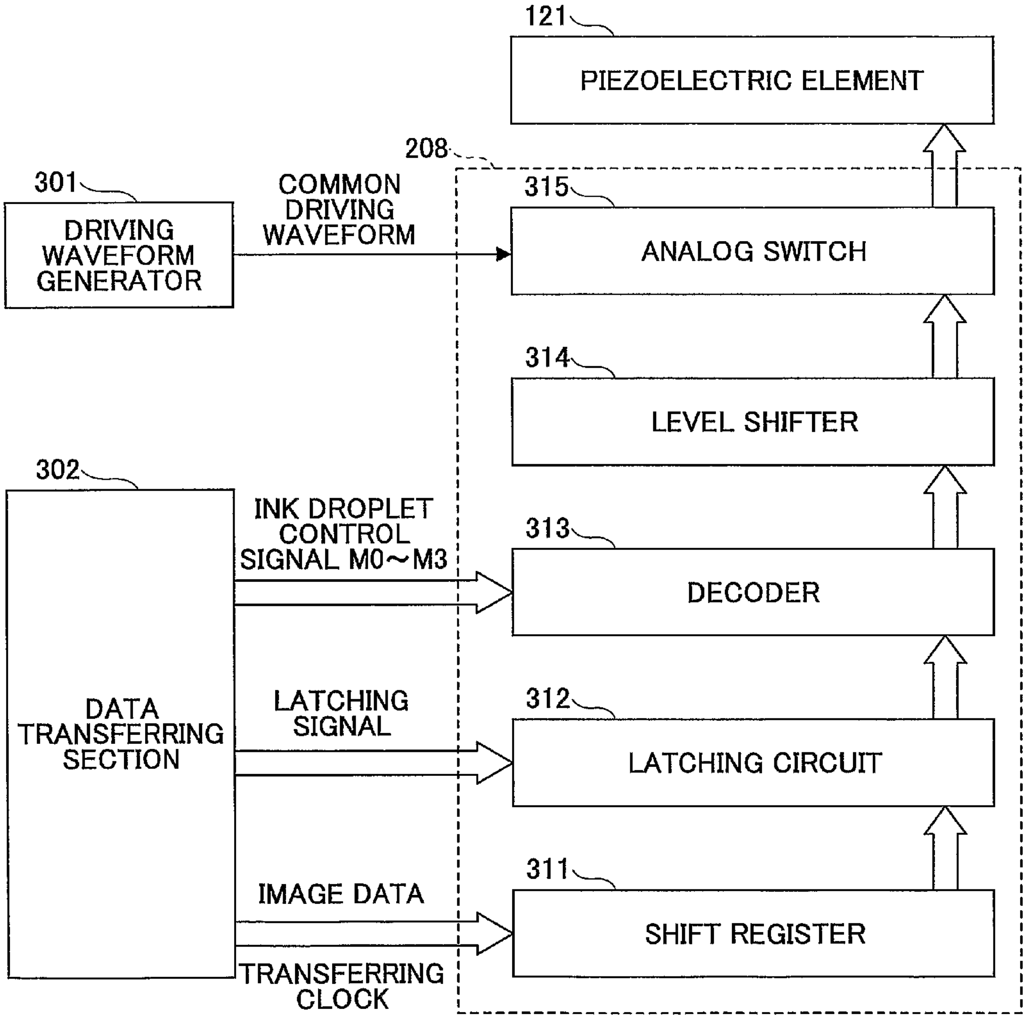
FIG. 8 is a block diagram showing a part of a head driving controller and a head driver shown in FIG. 7.

Next, referring to FIG. 8, the head driving controller 207 and the head driver 208 are explained. FIG. 8 is a block diagram showing a part of the head driving controller 207 and the head driver 208 shown in FIG. 7.

As shown in FIG. 8, the head driving controller 207 includes a driving waveform generator 301 which generates a driving waveform (common driving waveform) composed of plural driving pulses (driving signals) in one ink droplet ejecting cycle and outputs the driving waveform, and a data transferring section 302 which outputs image data (print data), a transferring clock, a latching signal, and ink droplet control signals M0 to M3. The ink droplet control signals M0 to M3 instruct opening and closing of an analog switch 315 of the head driver 208 every ink droplet. Each of the ink droplet control signals M0 to M3 is selected corresponding to an ejecting cycle of the common driving waveform and becomes an H level when selected, and becomes an L level when not selected.

The head driver 208 includes a shift register 311, a latching circuit 312, a decoder 313, a level shifter 314, and the analog switch 315. To the shift register 311, the transferring clock (shift clock) and serial image data from the data transferring section 302 are input. The latching circuit 312 latches each register value of the shift register 311 by a latching signal. The decoder 313 decodes the image data and the ink droplet control signals M0 to M3 and outputs the decoded results. The level shifter 314 shifts the level of a logic level voltage signal of the decoder 313 to a level by which the analog switch 315 can be operated. The analog switch 315 is opened or closed by an output from the decoder 313 given via the level shifter 314.

The analog switch 315 is connected to the individual electrode 153 (selection electrode) of the piezoelectric element 121, and the common driving waveform is input from the driving waveform generator 301 to the analog switch 315. Therefore, the analog switch 315 becomes ON corresponding to the decoded results of serial image data and the ink droplet control signals M0 to M3 decoded by the decoder 313, and a desired driving signal in the common driving waveform is passed (selected) and the desired driving signal is applied to the piezoelectric element 121.

Figure 9:
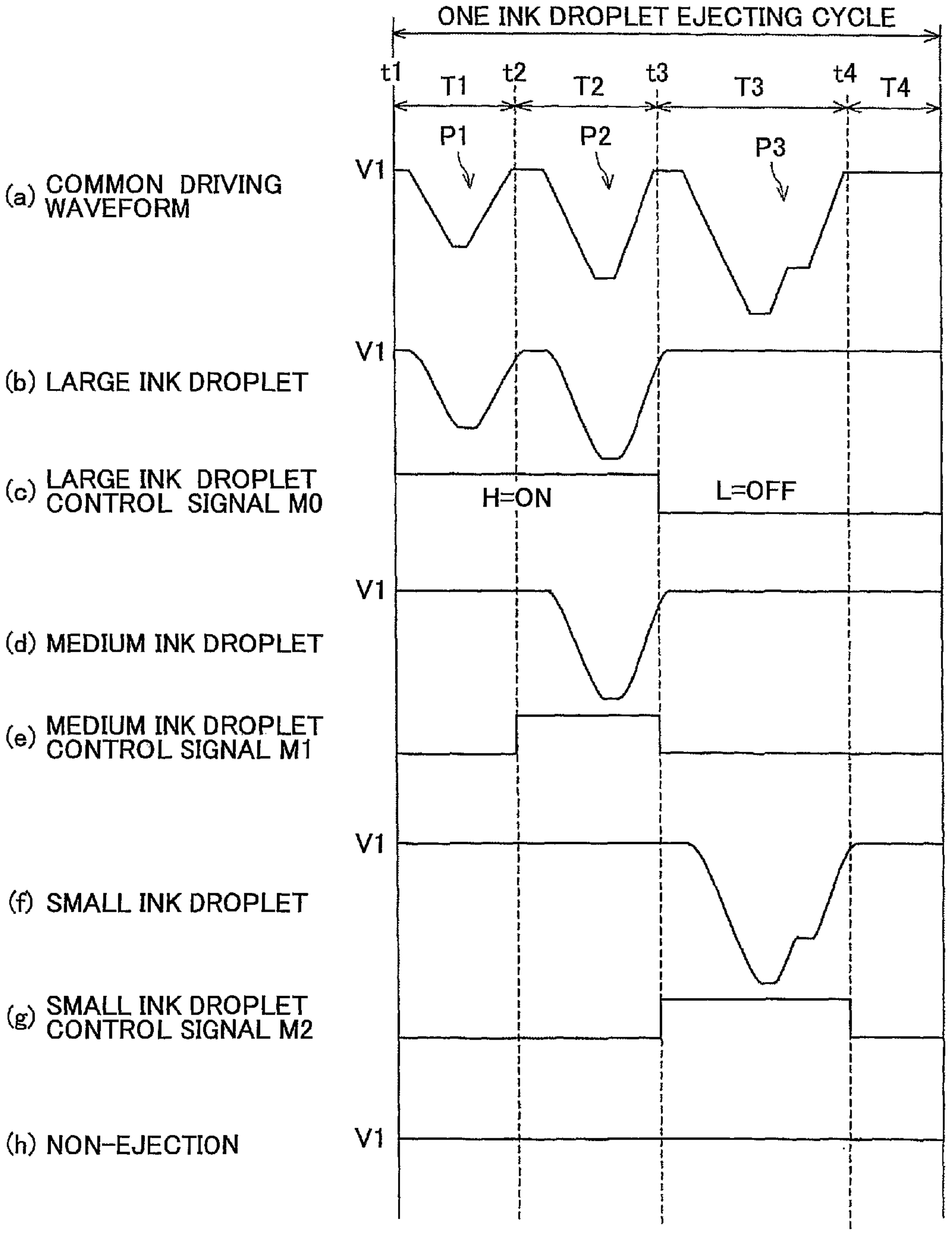
FIG. 9 is a timing diagram showing an operation of the head driver shown in FIG. 8.

Next, referring to FIG. 9, an operation of the head driver 208 is explained. FIG. 9 is a timing diagram showing the operation of the head driver 208 shown in FIG. 8.

First, as shown in FIG. 9 (*a*), the driving waveform generator 301 outputs a common driving waveform including plural pulses (driving signals) P1, P2, and P3 in one ink droplet ejecting cycle. That is, the common driving waveform falls from the reference voltage (electric potential) V1 (the volume of the liquid chamber 106 is expanded), after the passage of a predetermined holding time, the common driving waveform rises toward the reference voltage V1 (the volume of the liquid chamber 106 is decreased), and these are continued.

In this, a large ink droplet is formed by causing the pulses P1 and P2 to eject two ink droplets and to integrate the two ink droplets while they are flying (airborne). In addition, a medium ink droplet is ejected by causing the falling voltage of the pulse P2 to be set lower than that of the pulse P1, and a small ink droplet is ejected by causing the falling voltage of the pulse P3 to be set lower than that of the pulse P2 and by causing the voltage of the pulse P3 to rise with a step.

When the large ink droplet is selected, as shown in FIGS. 9 (*b*) and (*c*), the driving waveform generator 301 outputs a large ink droplet control signal M0 which becomes an H level in the periods T1 and T2 corresponding to the pulses P1 and P2. When the medium ink droplet is selected, as shown in FIGS. 9 (*d*) and (*e*), the driving waveform generator 301 outputs a medium ink droplet control signal M1 which becomes an H level in the period T2 corresponding to the pulse P2. When the small ink droplet is selected, as shown in FIGS. 9 (*f*) and (*g*), the driving waveform generator 301 outputs a small ink droplet control signal M2 which becomes an H level in the period T3 corresponding to the pulse P3. At the time of non-ejection, as shown in FIG. 9 (*h*), the common driving waveform is maintained in the reference voltage V1.

Therefore, corresponding to the image data transferred from the data transferring section 302, the large ink droplet, the medium ink droplet, the small ink droplet, and the non-ejection can be selected. That is, multi-level dots with four gradations can be formed from a large dot, a medium dot, a small dot, and non-ejection of a dot.

Next, an image processing apparatus and an inkjet recording apparatus according to the embodiment of the present invention are explained, in which image processing apparatus a program for performing an image processing method for outputting a print image including that a document is prohibited from being duplicated is installed.

Figure 10:
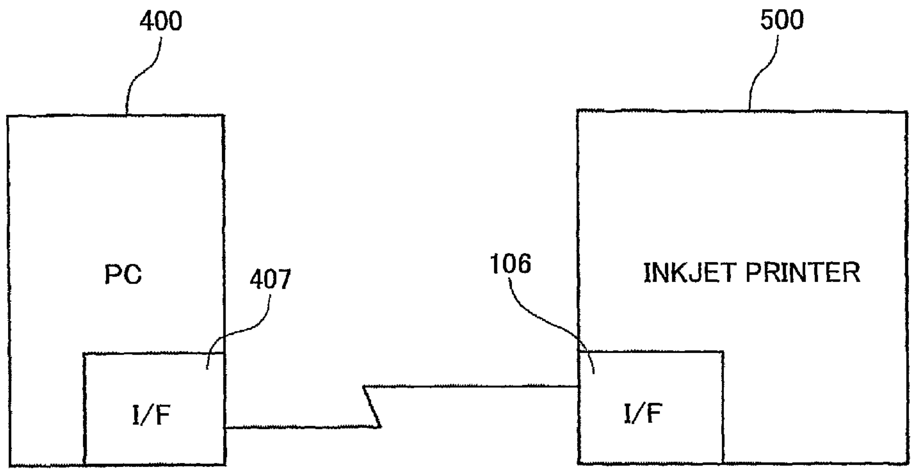
FIG. 10 is a block diagram showing a printing system composed of an image processing apparatus and an inkjet printer according to the embodiment of the present invention.

FIG. 10 is a block diagram showing a printing system composed of an image processing apparatus and an inkjet recording apparatus according to the embodiment of the present invention. In FIG. 10, as the inkjet recording apparatus, an inkjet printer is used.

The printing system (image forming system) is composed of one or plural image processing apparatuses 400 such as a PC (personal computer) and an inkjet printer 500 which are connected by a predetermined interface or a network.

Figure 11:
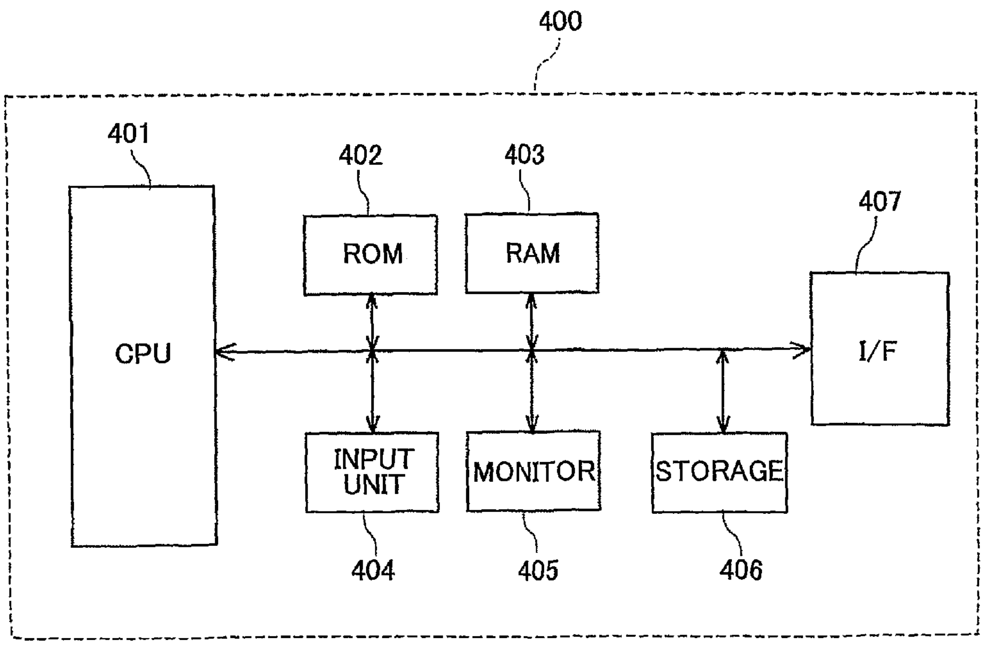
FIG. 11 is a block diagram showing the image processing apparatus shown in FIG. 10.

FIG. 11 is a block diagram showing the image processing apparatus 400 shown in FIG. 10. As shown in FIG. 11, in the image processing apparatus 400, a CPU 401 is connected to a ROM 402 and a RAM 403 via a bus line. In addition, storage 406 using a magnetic device such as a hard disk, an input unit 404 composed of a mouse, a key board, and so on, and a monitor 405 composed of an LCD, a CRT, and so on, are connected to the bus line via predetermined interfaces. Further, a recording medium reading device for reading data in a recording medium such as an optical disc (not shown) is connected to the bus line via a predetermined interface. An interface (I/F) 407 which communicates with a network such as the Internet and an external device connected to a USB are connected to the bus line.

In the image processing apparatus (PC) 400, an image processing program according to the embodiment of the present invention is stored in the storage 406. The image processing program is read from a recording medium by a recording medium reading device, or is downloaded from a network such as the Internet, and is installed in the storage 406. By the installation of the image processing program, the image processing apparatus 400 can perform the image processing. The image processing program can be operated on a predetermined OS or can be a part of specific application software.

Figure 12:
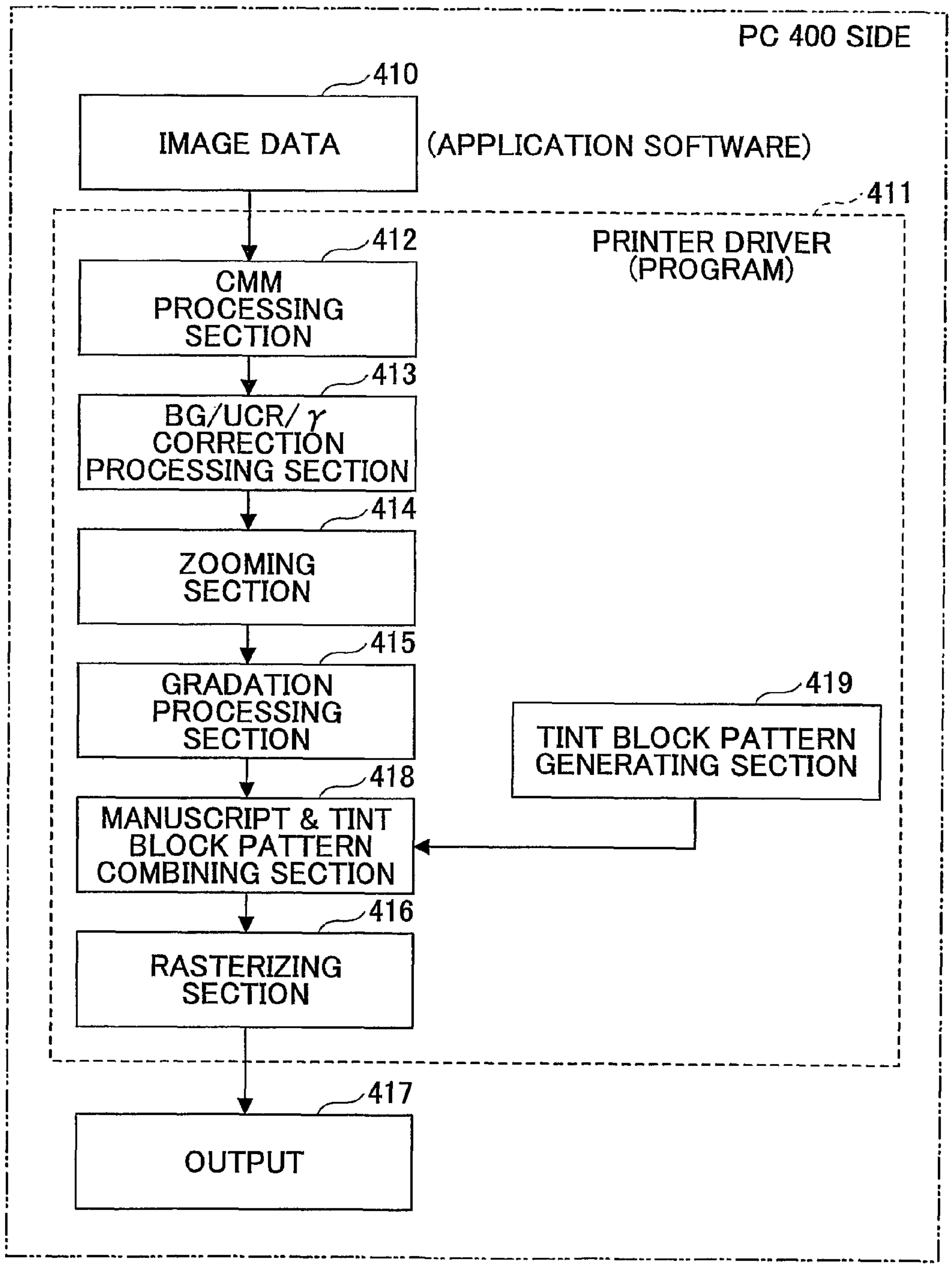
FIG. 12 is a block diagram showing functions of an image processing method which is performed by an image processing program in the image processing apparatus according to the embodiment of the present invention.

FIG. 12 is a block diagram showing functions of an image processing method which is performed by the image processing program in the image processing apparatus 400 according to the embodiment of the present invention. Referring to FIG. 12, the image processing method is explained.

In this case, the image processing method is performed by a host computer such as a PC (an image processing apparatus), and the PC is frequently used for a relatively low-cost inkjet printer in a printing system.

A printer driver 411 is the image processing program in the image processing apparatus 400 according to the embodiment of the present invention, and includes a CMM (color management module) processing section 412, a BG/UCR/γ correction processing section 413, a zooming section 414, a gradation processing section 415, a rasterizing section 416, a manuscript and tint block combining section 418, and a tint block generating section 419. The CMM processing section 412 transforms image data 410 given from application software from a color space for a monitor display into a color space for a recording device (from RGB into CMY). The BG/UCR/γ correction processing section 413 performs BG (black generation)/UCR (under color removal) processing from a CYM value and performs a γ correction which is an input/output correction reflecting a characteristic of a recording device and user taste. The zooming section 414 performs a zooming process corresponding to resolution of the recording device. The gradation processing section 415 rearranges the image data to dot pattern disposition data for ejecting ink from the recording device including a multi-level and a small value matrix. The rasterizing section 416 divides dot pattern data which are print image data obtained from the manuscript and tint block pattern combining section 418 (described below) into data for each scanning and arranges the data to each nozzle position. An output 417 from the rasterizing section 416 is sent to the inkjet printer 500.

The manuscript and tint block pattern combining section 418 combines manuscript image data output from the gradation processing section 415 which are transformed into data corresponding to multi-level dots that can be output from the inkjet printer 500 by applying an image process to the image data 410 with data corresponding to multi-level dots of an image pattern (hereinafter, referred to as a tint block pattern) indicating that a document is prohibited from being duplicated generated by the tint block generating section 419. Since the manuscript and tint block pattern combining section 418 combines the manuscript image data with the data of the tint block pattern corresponding to multi-level dots that can be output from the inkjet printer 500, the print image data of the multi-level dots that can be output from the inkjet printer 500 are generated.

That is, a manuscript image is transformed into manuscript image data corresponding to multi-level dots that can be output from the inkjet printer 500 by applying an image process to the manuscript image, and the manuscript image data are combined with data corresponding to multi-level dots of the tint block pattern indicating that the document is prohibited from being duplicated. With this, print image data corresponding to multi-level dots that can be output from the inkjet printer 500 are generated. Therefore, when the document is duplicated by the inkjet printer 500, it can be confirmed that the document is duplicated by the tint block pattern.

Figure 13:
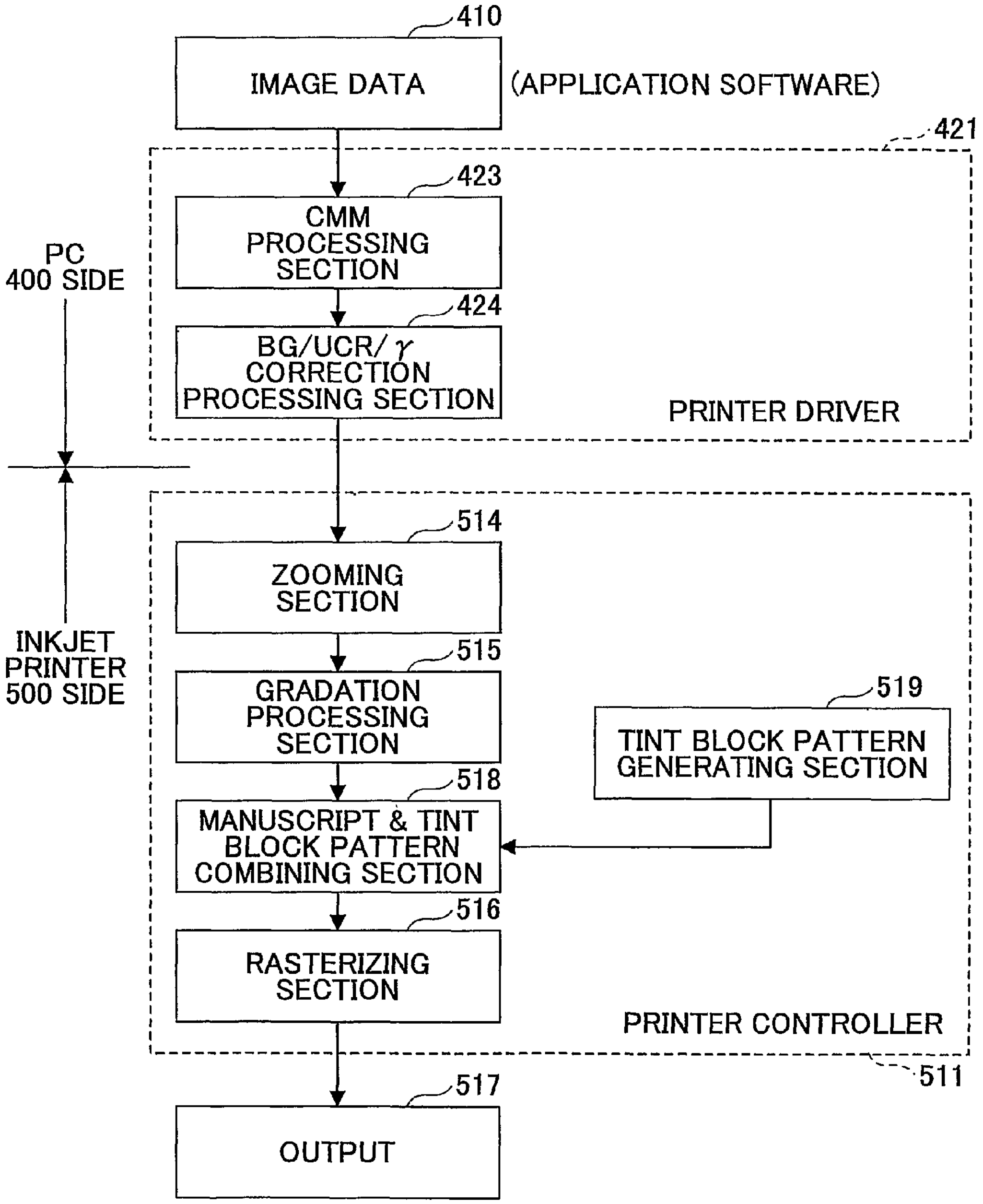
FIG. 13 is a block diagram showing functions of the image processing method which is performed by another image processing program in the image processing apparatus according to the embodiment of the present invention.

Next, another example in which the image processing method is performed by both the image processing apparatus 400 and the inkjet printer 500 is explained. FIG. 13 is a block diagram showing functions of an image processing method which method is performed by another image processing program in the image processing apparatus 400 and the inkjet printer 500. That is, the inkjet printer 500 mainly performs the image processing method and the image processing apparatus 400 performs a part of the image processing method. With this, a high-speed image processing method can be performed by this example.

A printer driver 421 in the image processing apparatus 400 includes a CMM processing section 423 which transforms image data 410 given from application software from a color space for a monitor display into a color space for a recording device (from RGB into CMY), and a BG/UCR/γ correction processing section 424 which performs BG (black generation)/UCR (under color removal) processing from a CYM value and performs a γ correction which is an input/output correction reflecting a characteristic of a recording device and user taste. Image data which are manuscript data generated from the BG/UCR/γ correction processing section 424 are sent to the inkjet printer 500.

A printer controller 511 (corresponding to the controlling section 200 in FIG. 7) in the inkjet printer 500 includes a zooming section 514 which performs a zooming process corresponding to resolution of the recording device, a gradation processing section 515 which rearranges the image data to dot pattern disposition data for ejecting ink from the recording device including a multi-level and a small value matrix, and a rasterizing section 516 which divides dot pattern data which are print image data obtained from a manuscript and tint block pattern combining section 518 (described below) into data in each scanning and arranges the data to for the position of each nozzle performing printing. An output 517 from the rasterizing section 516 is sent to the head driving controller 207 (see FIG. 7).

Further, the printer controller 511 includes the manuscript and tint block pattern combining section 518 which combines manuscript image data output from the gradation processing section 515. The image data are transformed into data corresponding to multi-level dots that can be output from the inkjet printer 500 by applying an image process to the image data input from the image processing apparatus 400 with data corresponding to multi-level dots of an image pattern (tint block pattern) indicating that a document is prohibited from being duplicated generated by a tint block generating section 519. Since the manuscript and tint block pattern combining section 518 combines the manuscript image data with the data of the tint block pattern corresponding to multi-level dots that can be output from the inkjet printer 500, the print image data corresponding to the multi-level dots that can be output from the inkjet printer 500 are generated.

That is, since the inkjet printer 500 includes the manuscript and tint block pattern combining section 518 which combines manuscript image data with data of a tint block pattern indicating that a document is prohibited from being duplicated generated by the tint block generating section 519, when the document is duplicated by the inkjet printer 500, and the rasterizing section 516 which forms print image data corresponding to the multi-level dots by applying an image process, it can be confirmed that the document is duplicated by the tint block pattern.

As the image processing method according to the embodiment of the present invention, any one of the methods shown in FIGS. 12 and 13 can be used. However, the example shown in FIG. 12 is used for the explanation of the embodiment of the present invention. That is, an example in which the inkjet printer 500 does not include a function that actually generates a recording dot pattern by receiving an image forming command or a print command, is explained in detail. In other words, a print command from application software which is executed in the image processing apparatus 400 is processed in the printer driver 411 (software) in the image processing apparatus 400 (host computer), dot pattern data of multi-level dots (print image data) which can be output from the inkjet printer 500 are generated in the image processing apparatus 400, the print image data are rasterized and the data are transferred to the inkjet printer 500, then output from the inkjet printer 500.

Specifically, in the image processing apparatus 400, a manuscript such as a document and a drawing is formed by using application software (for example, Word or Excel of Microsoft, registered trademarks). The application software is not limited to the above described software. By a print command for the manuscript from the application software or an OS, in order that the inkjet printer 500 can print the manuscript, the printer driver 411 in the image processing apparatus 400 (host computer) generates image data of the manuscript composed of dot size information which can be reproduced by the inkjet printer 500 by applying image processing such as CMM, BG/UCR/γ correction, zooming, and gradation processing to image data of the manuscript.

In inkjet printers, an ejecting method of ink droplets, a required resolution, and a using dot size is different corresponding to desired print quality. Therefore, n kinds of dot sizes are available in one print mode, and the image data show n dot sizes. In the inkjet printer 500, the number of dot sizes used in one print mode is four. The size (volume) of an ejecting ink droplet cannot always be controlled accurately for an ejecting frequency, and when the number of bits of data expressing multi-level dots is increased, processing the image data becomes slow; therefore, it is decided that the size of dots is four or less in the embodiment of the present invention. Consequently, manuscript image data applied to the image processing become image data having four-value dot information, and can be expressed by two bits.

A tint block pattern is generated by the tint block pattern generating section 419. The tint block pattern generating section 419 generates a tint block pattern (image pattern) formed by dot size information reproducible by the inkjet printer 500. That is, a dot size value in the tint block pattern data and that in the image data formed by the manuscript are equal in the inkjet printer 500. For example, when 4-value dots are expressed by 2 bits (bit1, bit0), (0 0) shows non-ejection of an ink droplet, (0 1) shows a small ink droplet, (1 0) shows a medium ink droplet, and (1 1) shows a large ink droplet.

Figure 14:
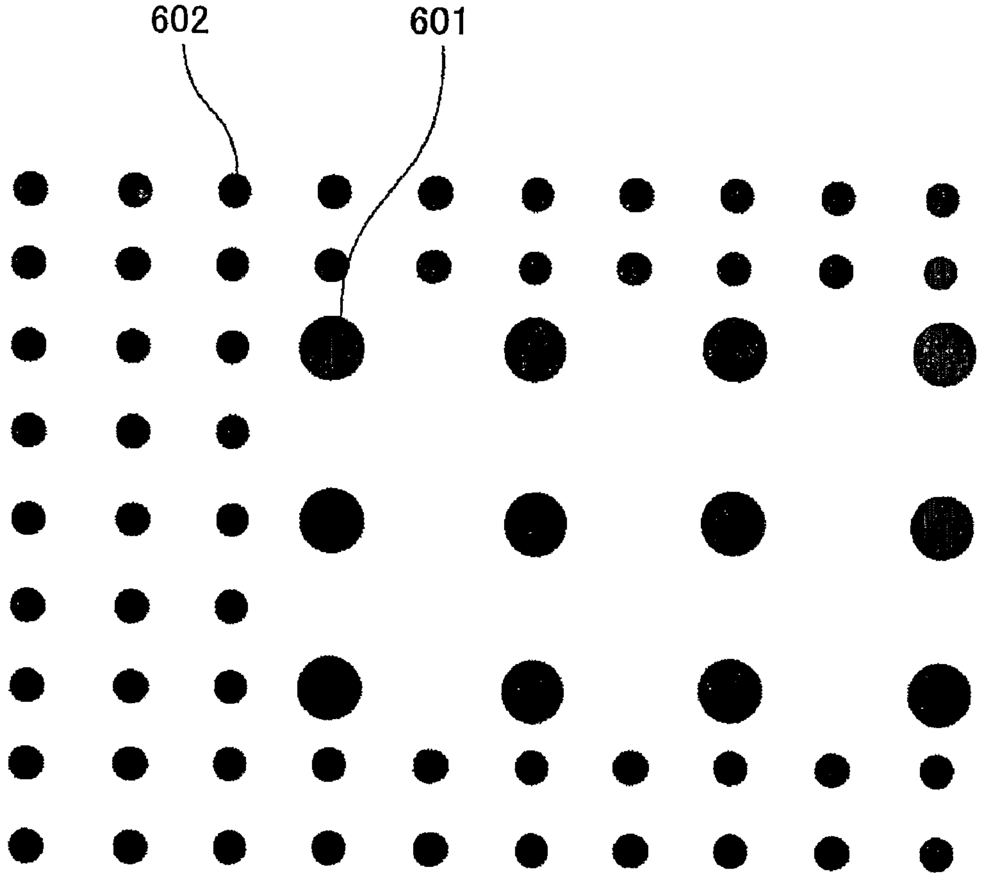
FIG. 14 is a diagram showing an example of a tint block pattern.

FIG. 14 is a diagram showing an example of the tint block pattern. As shown in FIG. 14, a dot pattern of the tint block pattern is composed of dots having constant dot sizes whose array density is constant. The tint block pattern is composed of dots 601 having a large dot diameter which show letters indicating that this document is prohibited from being duplicated at the time of print out and dots 602 having a small dot diameter showing a background. The dots 602 showing the background are formed at dot positions determined by the recording density, and the dots 601 showing letters indicating that this document is prohibited from being duplicated are formed by having a vacant space of one dot in the main scanning direction and the sub scanning direction.

That is, the tint block pattern is formed by at least two dots whose diameters are different from each other; with this, a mark part such as letters showing that the document is prohibited from being duplicated and a background part can be printed. Further, the tint block pattern can be formed by at least two dots whose diameters are different from each other with a different array density; with this, a mark part such as letters indicating that the document is prohibited from being duplicated and a background part can be printed.

When the size of dots of the tint block pattern is studied, the size of dots can be selected. That is, for example, when a recording medium in which a manuscript having a tint block pattern is formed is read by a scanner of a duplicating apparatus, by selecting the size of dots, the dots 601 which show letters indicating that the manuscript is prohibited from being duplicated can be detected and the dots 602 showing the background are not detected.

That is, it is decided that the size of the dots 601 is a large ink droplet dot reproducible at the time of duplicating a manuscript at the duplicating apparatus and the size of the dots 602 is relatively smaller than that of the dots 601; that is, the size of the dots 602 is hardly reproducible at the time of duplicating. In this, reproducibility of dots at the time of duplicating the document depends on the size of dots which can be surely read by a scanner in relation with the resolution of the duplicating apparatus. Further, the reproducibility of dots at the time of duplicating the document depends on various factors, for example, that the duplicating apparatus includes a noise removing function.

The black pixel concentration per unit area of the two dot patterns formed by the dots 601 and the dots 602 are almost the same, so that when they are juxtaposed, human eyes see them as being the same. However, when the document is duplicated, only the mark part and the manuscript are detected by the scanner and the letters indicating that the document is prohibited from being duplicated and the manuscript are printed on a recording medium; with this, it can be confirmed that the document is prohibited from being duplicated.

In addition, when the dots 601 and the dots 602 are formed by the same color, the mark part and the background part are hardly distinguishable at the time of printing.

Figure 15:
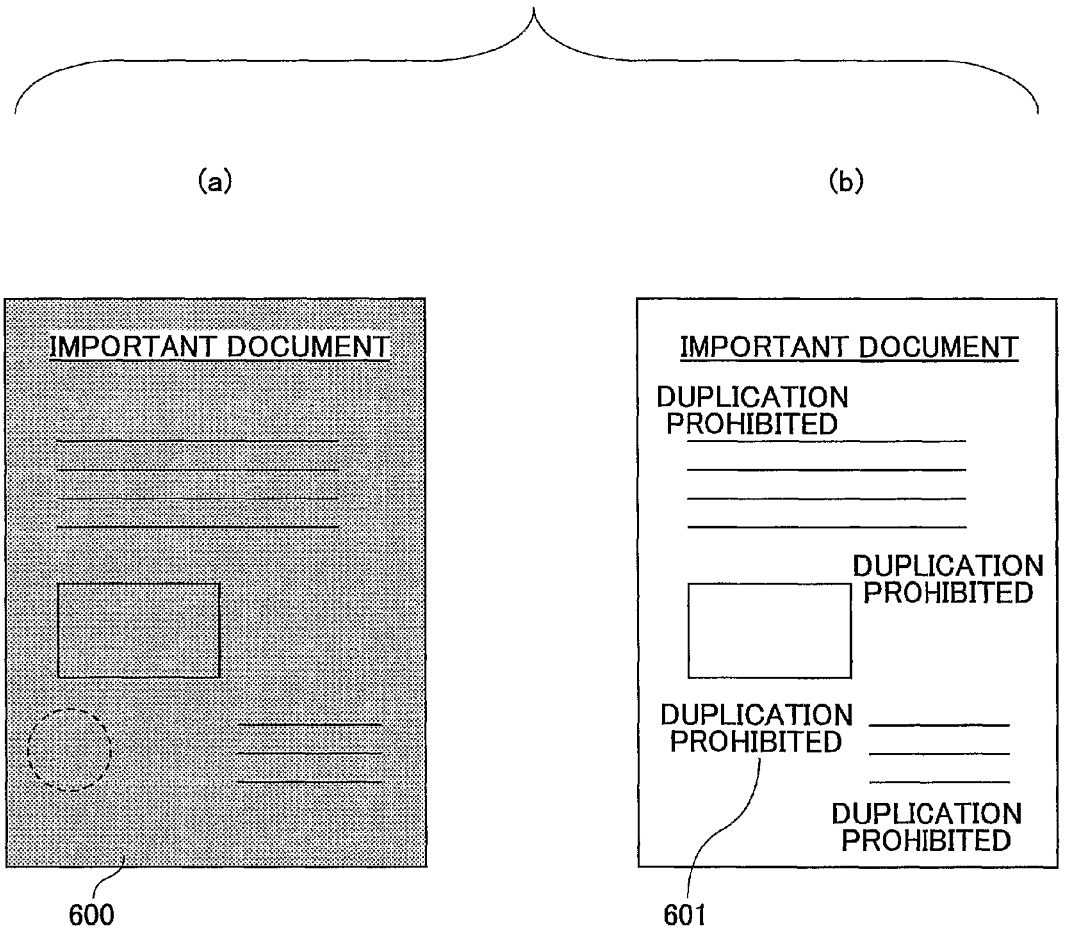
FIG. 15 is a diagram showing a document in which the tint block pattern is formed.

Referring to FIG. 15, an example in which a document with a tint block pattern is printed and the printed document is duplicated is explained. FIG. 15 is a diagram showing a document in which a tint block pattern is formed. In FIG. 15 (*a*), a print image of the document printed by the inkjet printer 500 is shown. In FIG. 15 (*b*), a duplicated image of the print image produced by a duplicating apparatus is shown. As shown in FIG. 15 (*a*), in a print image printed by the inkjet printer 500, a tint block pattern 600 is formed on the entire face of the document by the inkjet printer 500. In this, the tint block pattern 600 can be formed on a blank space other than the manuscript part. The tint block pattern is formed by two kinds of ink droplet dots as described above. When the document is duplicated, only dots formed by the large ink droplets are detected by the duplicating apparatus and recorded on a paper with the manuscript. As shown in FIG. 15 (*b*), letters indicating that the document is prohibited from being duplicated (in this case, letters “DUPLICATION PROHIBITED”) appear; with this, it can be confirmed that the document is prohibited from being duplicated.

Next, the generating process of the tint block pattern by the tint block generating section 419 is explained in more detail. In the image processing apparatus 400, data of the tint block pattern are stored in the storage 406 which is a predetermined memory. The CPU 401 reads the data of the tint block pattern from the storage 406 and adjusts the size of the data of the tint block pattern so that the tint block pattern can be formed on the entire face of the manuscript and generates data of the tint block pattern corresponding to multi-level dots which can be output from the inkjet printer 500.

The data of the tint block pattern is combined with the manuscript image data (document) by the manuscript and tint block pattern combining section 418 in the printer driver 411.

In the combining process, for example, the manuscript image data are multi-level data (for example, 2-bit data), and the data of the tint block pattern are the same multi-level data. In the manuscript image data, data showing non-ejection of an ink droplet are (0 0) in (bit1, bit0). Therefore, only when the manuscript image data are (0 0), an OR operation (when either bit is “1”, it is decided to be “1” after combining) is performed with the data of the tint block pattern. With this, when the data of the tint block pattern are multi-level dot data in the non print region of the manuscript image data, in the non printing region, data are changed to multi-level image data (print data).

After this, a rasterizing process is applied to the data output from the manuscript and tint block pattern combining section 418 at the rasterizing section 416, corresponding to the head structure of the inkjet printer 500, and image data having a delay corresponding to data horizontal and vertical transformation and nozzle disposition are transferred to the inkjet printer 500 via the interface 407. The inkjet printer 500 stores the transferred image data in a raster data memory. When predetermined data are received, the inkjet printer 500 drives the recording head 11 corresponding to the received data and prints image data in which the manuscript and the tint block pattern are formed on a recording medium (paper 22).

Next, a duplicating apparatus which duplicates a secret document printed out from the inkjet printer 500 is explained.

As described above, when a printed out manuscript having a tint block pattern is duplicated, a part of the tint block pattern appears in the duplicated document. In the example shown in FIG. 15, letters 601 “DUPLICATION PROHIBITED” appear. As described above, when a manuscript in which a tint block pattern is embedded is duplicated, either a letter region or a background region appears. This comes from that one region is reproducible and the other region is hardly reproducible. In other words, since a region which does not appear is not noticed, a remaining region can be noticed.

As described above, a tint block pattern generating such a phenomenon is composed of a set of two kinds of dots whose sizes are different. That is, a small dot is hardly reproduced and a large dot is reproduced of the two dots. In an inkjet printer, a large dot must have a large diameter which can be reproduced and a small dot must have a small diameter which is hardly reproduced. In the inkjet printer, as described above, two dot diameters are realized by changing energy of a driving waveform which is given to the piezoelectric element.

In order to decide necessary dot sizes in the multi-level dot sizes in the inkjet printer, an inkjet printer in which the above described recording head including the above ink and piezoelectric elements is installed is manufactured. Further, by changing the dot size, a dot reproducing experiment is performed by printing a document on a normal paper by embedding a tint block pattern.

Conditions of the dot reproducing experiment are as follows.

[Inkjet Printer]

Nozzle array pitch: 300 dpi

The number of nozzles: 384 nozzles/color, ×4 colors (YMCK)

Image resolution: 300 dpi, 600 dpi

The diameter of dots: 40, 60, 70, 80, 90, 120, 140 μm (variable depending on the number of driving pulses and a driving voltage)

Formed image colors: (primary colors) K, C, M, Y (secondary colors) R, G, B

As a result of the dot reproducing experiment, in colors of K, C, M, R, G, and B, when the diameter of the dot is 80 μm or more, the tint block pattern is reproduced, and when the diameter thereof is 90 μm or more, the tint block mark is reproduced without blurring on the entire region.

Therefore, from the above experiment, it is necessary that the diameter of the dot be 80 μm or more; further, in order to surely reproduce the dots, the diameter of the dot is required to be 90 μm or more. In the case ofY (yellow), the dots cannot be reproduced even when the diameter of the dots is 140 μm (maximum diameter). In order not to surely reproduce the dots without staining the face of the paper, the diameter of the dot is required to be 60 μm or less. Therefore, in the image processing apparatus and the inkjet printer according to the embodiment of the present invention, the driving voltage is decided so that the diameter of the dots becomes the above value.

Figure 16:
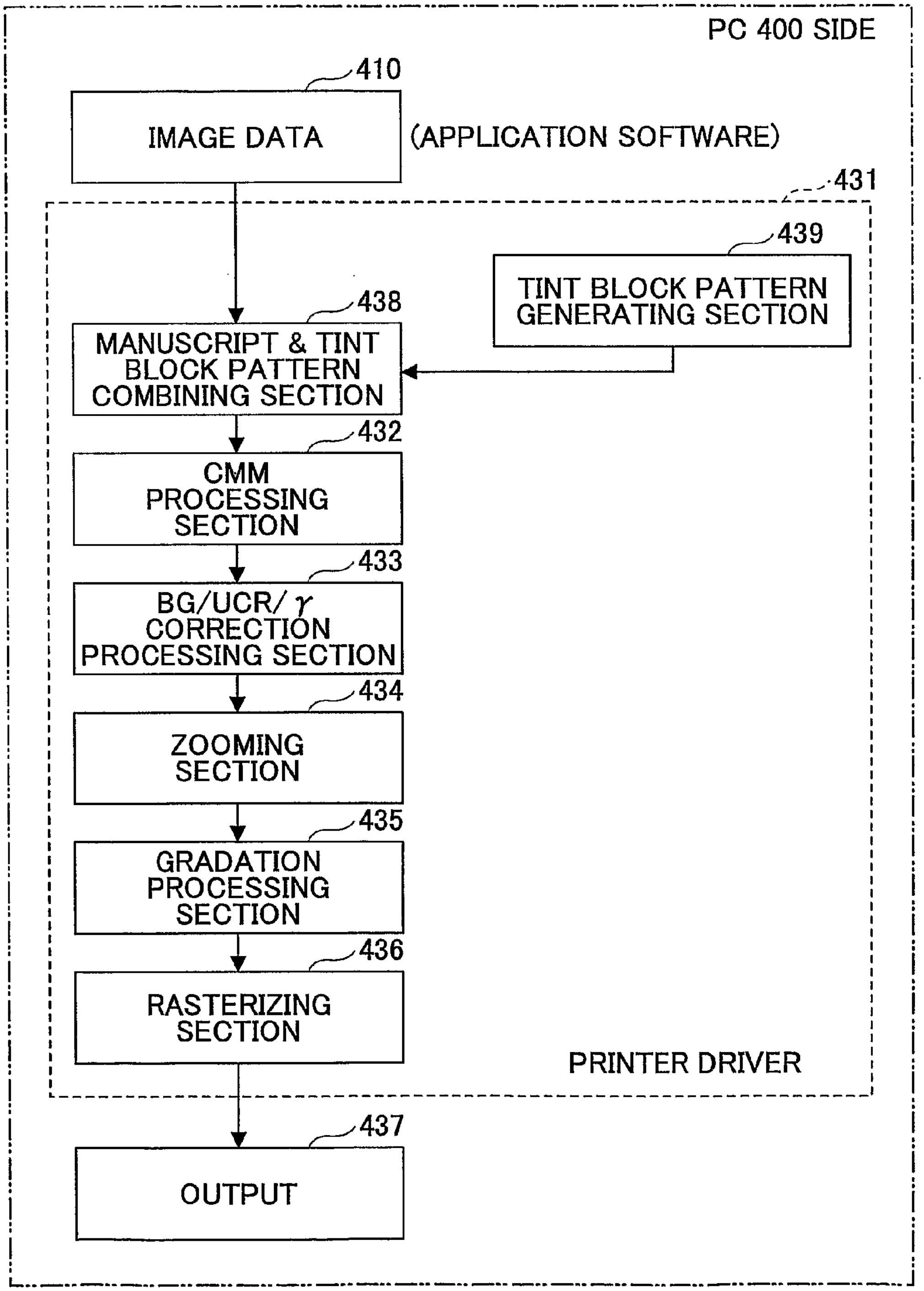
FIG. 16 is a block diagram showing functions of the image processing method which is performed by the image processing program in the image processing apparatus according to another embodiment of the present invention.

Next, referring to FIG. 16, an image processing method, a program thereof, and an image processing apparatus according to another embodiment of the present invention are explained. FIG. 16 is a block diagram showing functions of the image processing method which is performed by the image processing program in the image processing apparatus according to another embodiment of the present invention. In this case, the image processing method is performed by a host computer such as a PC (an image processing apparatus), and the PC is frequently used for a relatively low-cost inkjet printer in a printing system.

A printer driver 431 is an image processing program in the image processing apparatus 400 according to another embodiment of the present invention, and includes a manuscript and tint block pattern combining section 438 which combines image data 410 of a manuscript given from application software with image data of a tint block pattern given from a tint block pattern generating section 439.

Further, the printer driver 431 includes a CMM processing section 432, a BG/UCR/γ correction processing section 433, a zooming section 434, a gradation processing section 435, and a rasterizing section 436. The CMM processing section 432 transforms the image data output from the manuscript and tint block pattern combining section 438 from a color space for a monitor display into a color space for a recording device (from RGB into CMY). The BG/UCR/γ correction processing section 433 performs BG (black generation)/UCR (under color removal) processing from a CYM value and performs a γ correction which is an input/output correction reflecting a characteristic of a recording device and a user taste. The zooming section 434 performs a zooming process corresponding to resolution of the recording device. The gradation processing section 435 rearranges the image data to dot pattern disposition data ejecting from the recording device including a multi-level and a small value matrix. The rasterizing section 436 divides dot pattern data into data in each scanning and meets the data to each nozzle position. An output (print image data) 437 from the rasterizing section 436 is sent to the inkjet printer 500.

Specifically, in the image processing apparatus 400 which is a host computer (PC), a manuscript such as a document and a drawing is formed by using application software (for example, Word or Excel of Microsoft, registered trademarks). The application software is not limited to the above described software. By a print command for the manuscript from the application software or an OS, the printer driver 431 in the image processing apparatus 400 (host computer) causes the tint block pattern generating section 439 to generates a tint block pattern. The tint block pattern data generated at this time are different from the tint block pattern data described above, are image data equal to the manuscript data (generally, 8-bit data). The image data of the tint block pattern are combined with the manuscript image data and image data in which the tint block pattern is embedded in a blank space of the manuscript are formed.

After this, in order to print out the image data from the inkjet printer 500, image processing such as the CMM processing, the BG/UCR/γ correction processing, the zooming processing, and the gradation processing is applied to the image data output from the manuscript and tint block pattern combining section 438, and image data composed of dot size information which can be reproduced by the inkjet printer 500 are formed. Since the image processing is applied to the tint block pattern, values, by which the dot sizes becoming the letters and the background of the tint block pattern can be reproduced even when the image processing is applied, are set beforehand in the image data of the tint block pattern, and the image data are formed by the values.

In an inkjet printer, an ejecting method of ink droplets, a required resolution, a using dot size are different corresponding to desired print quality; therefore, n kinds of dot sizes are available in one print mode. Therefore, the image data show n values.

In the inkjet printer 500, the number of dot sizes using in one print mode is four. The size (volume) of an ejecting ink droplet cannot be always controlled accurately for an ejecting frequency, and when the number of bits of data expressing multi-level dots is increased, the speed processing the image data becomes slow; therefore, it is decided that the size of dots is four or less. Consequently, manuscript image data applied the image processing become image data having four-value dot information, and can be expressed by two bits.

As described above, as shown in FIG. 14, a dot pattern of the tint block pattern is composed of dots having constant dot sizes whose array density is constant. The tint block pattern is composed of dots 601 having a large dot diameter which shows letters indicating that this document is prohibited from being duplicated at the time of print out and dots 602 having a small dot diameter showing a background. The dots 602 showing the background are formed at dot positions determined by the recording density, and the dots 601 showing letters indicating that this document is prohibited from being duplicated are formed by having a vacant space of one dot in the main scanning direction and the sub scanning direction.

That is, the tint block pattern is formed by at least two dots whose diameters are different from each other; with this, a mark part such as letters showing that the document is prohibited from being duplicated and a background part can be printed. Further, the tint block pattern can be formed by at least two dots whose diameters are different from each other with a different array density; with this, a mark part such as letters showing that the document is prohibited from being duplicated and a background part can be printed.

When the size of dots of the tint block pattern is studied, the size of dots can be selected. That is, for example, when a recording medium in which a manuscript with a tint block pattern is formed is read by a scanner of a duplicating apparatus, by selecting the size of dots, the dots 601 showing letters indicating that the manuscript is prohibited from being duplicated can be detected and the dots 602 showing the background are not detected.

That is, it is decided that the size of the dots 601 is a large ink droplet dot reproducible at the time of duplicating a manuscript at the duplicating apparatus and the size of the dots 602 is relatively smaller than that of the dots 601, which is not reproducible at the time of duplicating. In this, reproducibility of dots at the time of duplicating the document depends on the size of dots which can be surely read by a scanner, in relation with the resolution of the duplicating apparatus. Further, the reproducibility of dots at the time of duplicating the document depends on various factors, for example, that the duplicating apparatus includes a noise removing function.

The black pixel concentration per unit area of the two dot patterns formed by the dots 601 and the dots 602 are almost the same, so that when they are juxtaposed, human eyes see them as being the same. However, when the document is duplicated, only the mark part and the manuscript are detected by the scanner. However, when the document is duplicated by the duplicating apparatus, the mark part and the manuscript are detected by the scanner and the letters indicating that the document is prohibited from being duplicated and the manuscript are printed on a recording medium; with this, it can be confirmed that the document is prohibited from being duplicated.

In addition, when steps of the image processing method are realized by a program which can be performed by a computer, a letter and a pattern indicating that a document is prohibited from being duplicated can be easily changed.

As described above, according to the embodiments of the present invention, when a manuscript is formed on a recording medium by embedding a pattern indicating that the manuscript is prohibited from being duplicated, the manuscript can be readably printed at a destination printing apparatus, without preparing a special paper in which a pattern indicating that the manuscript is prohibited from being duplicated is described. Therefore, complex operations such as changing the paper, selecting a paper storing cassette can be avoided. In addition, since an image is formed by combining a manuscript with a pattern indicating that the manuscript is prohibited from being duplicated beforehand, the document after being printed can be read without difficulty.

Further, the present invention is not limited to these embodiments, but various variations and modifications may be made without departing from the scope of the present invention.

The patent application is based on Japanese Priority Patent Application No. 2005-074318 filed on Mar. 16, 2005, with the Japanese Patent Office, the entire contents of which are hereby incorporated by reference.

The invention claimed is:

1. An image processing method for forming print image data to be printed by an image forming apparatus configured to form multi-level dots, comprising:

forming multi-level data corresponding to the multi-level dots of image data indicating a duplicated document; and generating print image data corresponding to the multi-level dots to be printed by the image forming apparatus by combining multi-level data corresponding to multi-level dots of manuscript image data with the multi-level data corresponding to the multi-level dots of the image data indicating the duplicated document in a manner such that the multi-level data corresponding to the multi-level dots of the image data indicating the duplicated document are added to the multi-level data corresponding to the multi-level dots of the manuscript image data in portions where the multi-level data corresponding to the multi-level dots of the manuscript image data indicates non-ejection, but only the multi-level data corresponding to the multi-level dots of the manuscript image data are used in a portion other than the portion where the multi-level data corresponding to the multi-level dots of the manuscript image data indicates non-ejection, wherein the multi-level dots of image data indicating the duplicated document include a dot indicating the duplicated document and a dot indicating background;

the dot indicating the duplicated document has a dot size that can be reproduced by a duplicating apparatus that duplicates the manuscript image data;

the dot indicating the background has a dot size that cannot be reproduced by the duplicating apparatus;

a set of possible dot size values of the multi-level data corresponding to the multi-level dots of the image data and a set of possible dot size values of the multi-level data corresponding to the multi-level dots of the manuscript image data are equal, and the dot size values are expressed by a predetermined number of bits; and rasterizing is applied to data output from combining the multi-level data corresponding to the multi-level dots of manuscript image data with the multi-level data corresponding to the multi-level dots of the image data indicating the duplicated document.

2. The image processing method as claimed in claim 1, wherein:

the image data indicating the duplicated document is formed by at least two dots whose sizes are different of one color at a time of printing.

3. An image processing apparatus, comprising:

a unit that performs the image processing method as claimed in claim 1.

4. The image processing method of claim 1, wherein the predetermined number of bits is at least two and the generating step comprises performing an OR operation with the manuscript image data and the image data indicating the duplicated document, wherein the manuscript image data and the image data are each represented by the predetermined number of bits at each data point.

5. An image processing method for forming print image data to be printed by an image forming apparatus configured to perform multi-level dots, comprising:

combining multi-level data corresponding to multi-level dots of manuscript image data with multi-level data corresponding to multi-level dots of image data indicating a duplicated document in a manner such that the multi-level data corresponding to the multi-level dots of the image data indicating the duplicated document are added to the multi-level data corresponding to the multi-level dots of the manuscript image data in portions where the multi-level data corresponding to the multi-level dots of the manuscript image data indicates non-ejection, but only the multi-level data corresponding to the multi-level dots of the manuscript image data are used in a portion other than the portion where the multi-level data corresponding to the multi-level dots of the manuscript image data indicates non-ejection, wherein the multi-level dots of the image data indicating the duplicated document include a dot indicating the duplicated document and a dot indicating background, the dot indicating the duplicated document has a dot size that can be reproduced by a duplicating apparatus that duplicates the manuscript image data, and the dot indicating the background has a dot size that cannot be reproduced by the duplicating apparatus; and forming the print image data corresponding to the multi-level dots of the image data indicating the duplicated document by applying an image process to the combined data, wherein a set of possible dot size values of the multi-level data corresponding to the multi-level dots of the image data and a set of possible dot size values of the multi-level data corresponding to the multi-level dots of the manuscript image data are equal, and the dot size values are expressed by a predetermined number of bits, and rasterizing is applied to data output from combining the multi-level data corresponding to the multi-level dots of the manuscript image data with the multi-level data corresponding to the multi-level dots of the image data indicating the duplicated document.

6. The image processing method as claimed in claim 5, wherein:

the image data indicating the duplicated document is formed on only a background part of the manuscript image data.

7. The image processing method as claimed in claim 5, wherein:

the image data indicating the duplicated document is formed by at least two dots whose sizes are different of one color at a time of printing.

8. An image processing apparatus, comprising:

a unit that performs the image processing method as claimed in claim 5.

9. An image forming apparatus for forming print image data, comprising:

a combining unit configured to combine multi-level data corresponding to multi-level dots of manuscript image data with multi-level data corresponding to multi-level dots of image data indicating a duplicated document in a manner such that the multi-level data corresponding to the multi-level dots of the image data indicating the duplicated document are added to the multi-level data corresponding to the multi-level dots of the manuscript image data in portions where the multi-level data corresponding to the multi-level dots of the manuscript image data indicates non-ejection, but only the multi-level data corresponding to the multi-level dots of the manuscript image data are used in a portion other than the portion where the multi-level data corresponding to the multi-level dots of the manuscript image data indicates non-ejection, wherein the multi-level dots of the image data indicating the duplicated document include a dot indicating the duplicated document and a dot indicating background, the dot indicating the duplicated document has a dot size that can be reproduced by a duplicating apparatus that duplicates the manuscript image data, and the dot indicating the background has a dot size that cannot be reproduced by the duplicating apparatus; and a forming unit configured to form the print image data corresponding to the multi-level dots of the image data indicating the duplicated document by applying an image process to the combined data, wherein a set of possible dot size values of the multi-level data corresponding to the multi-level dots of the image data and a set of possible dot size values of the multi-level data corresponding to the multi-level dots of the manuscript image data are equal, and the dot size values are expressed by a predetermined number of bits, and rasterizing is applied to data output from the combining unit and obtained by combining the multi-level data corresponding to the multi-level dots of the manuscript image data with the multi-level data corresponding to the multi-level dots of the image data indicating the duplicated document.

10. The image forming apparatus as claimed in claim 9, wherein:

the image data indicating the duplicated document is formed on only a background part of the manuscript image data.

11. The image forming apparatus as claimed in claim 9, wherein:

the image data indicating the duplicated document is formed by at least two dots whose sizes are different of one color at a time of printing.

* * * * *

UNITED STATES PATENT AND TRADEMARK OFFICE

CERTIFICATE OF CORRECTION

PATENT NO. : 8,279,493 B2
APPLICATION NO. : 11/578553
DATED : October 2, 2012
INVENTOR(S) : Takashi Kimura et al.

It is certified that error appears in the above-identified patent and that said Letters Patent is hereby corrected as shown below:

On the title page, Item (86), the PCT information is incorrect. Item (86) should read:

--(86) PCT No.: PCT/JP2006/305469

§371 (c)(1),
(2), (4) Date: Oct. 16, 2006--

Signed and Sealed this
Fourth Day of December, 2012

David J. Kappos
*Director of the United States Patent and Trademark Office*